(12) United States Patent
Rolston

(10) Patent No.: US 8,139,122 B2
(45) Date of Patent: Mar. 20, 2012

(54) CAMERA WITH OPERATION FOR MODIFYING VISUAL PERCEPTION

(75) Inventor: Matthew Rolston, Beverly Hills, CA (US)

(73) Assignee: Matthew Rolston Photographer, Inc., Beverly Hills, CA (US)

( * ) Notice: Subject to any disclaimer, the term of this patent is extended or adjusted under 35 U.S.C. 154(b) by 766 days.

(21) Appl. No.: 12/195,369

(22) Filed: Aug. 20, 2008

(65) Prior Publication Data

US 2009/0051779 A1 Feb. 26, 2009

Related U.S. Application Data

(60) Provisional application No. 60/965,696, filed on Aug. 20, 2007.

(51) Int. Cl.
*H04N 5/228* (2006.01)
(52) U.S. Cl. ...................... 348/222.1; 348/373
(58) Field of Classification Search .................. 348/373, 348/222.1, 239; 434/100, 94, 371, 377; 362/145, 362/136
See application file for complete search history.

(56) References Cited

U.S. PATENT DOCUMENTS

| | | | | |
|---|---|---|---|---|
| 5,649,238 | A * | 7/1997 | Wakabayashi et al. | 396/61 |
| 7,394,538 | B2 * | 7/2008 | Bazin | 356/364 |
| 7,500,755 | B2 * | 3/2009 | Ishizaki et al. | 353/28 |
| 7,663,645 | B1 * | 2/2010 | Okamoto | 345/619 |
| 7,738,032 | B2 * | 6/2010 | Kollias et al. | 348/370 |
| 2002/0196333 | A1 * | 12/2002 | Gorischek | 348/61 |
| 2003/0041871 | A1 * | 3/2003 | Endo et al. | 132/301 |
| 2006/0044399 | A1 | 3/2006 | Fredlund et al. | |
| 2006/0158881 | A1 | 7/2006 | Dowling | |
| 2006/0245750 | A1 | 11/2006 | Liem | |
| 2008/0151092 | A1 * | 6/2008 | Vilcovsky | 348/333.01 |

\* cited by examiner

*Primary Examiner* — Nelson D. Hernández Hernández
(74) *Attorney, Agent, or Firm* — Steptoe & Johnson LLP

(57) ABSTRACT

Various embodiments directed to modifying and enhancing visual perception are disclosed. One embodiment is directed to a camera which includes a lens system for capturing images and a lighting system providing key light above the lens system and providing fill light below the lens system. A processor controls one or more operations of the camera, including automatically enhancing the captured images and presenting the enhanced images on a display. The system and method for modifying visual perception may also be directed to a video camera mirror system, a seating system, a cosmetic package, a lipstick packaging, a polarized mirror, an illuminated cosmetic brush, a personal portrait photography management system and an illumination system for modifying visual perception.

63 Claims, 23 Drawing Sheets

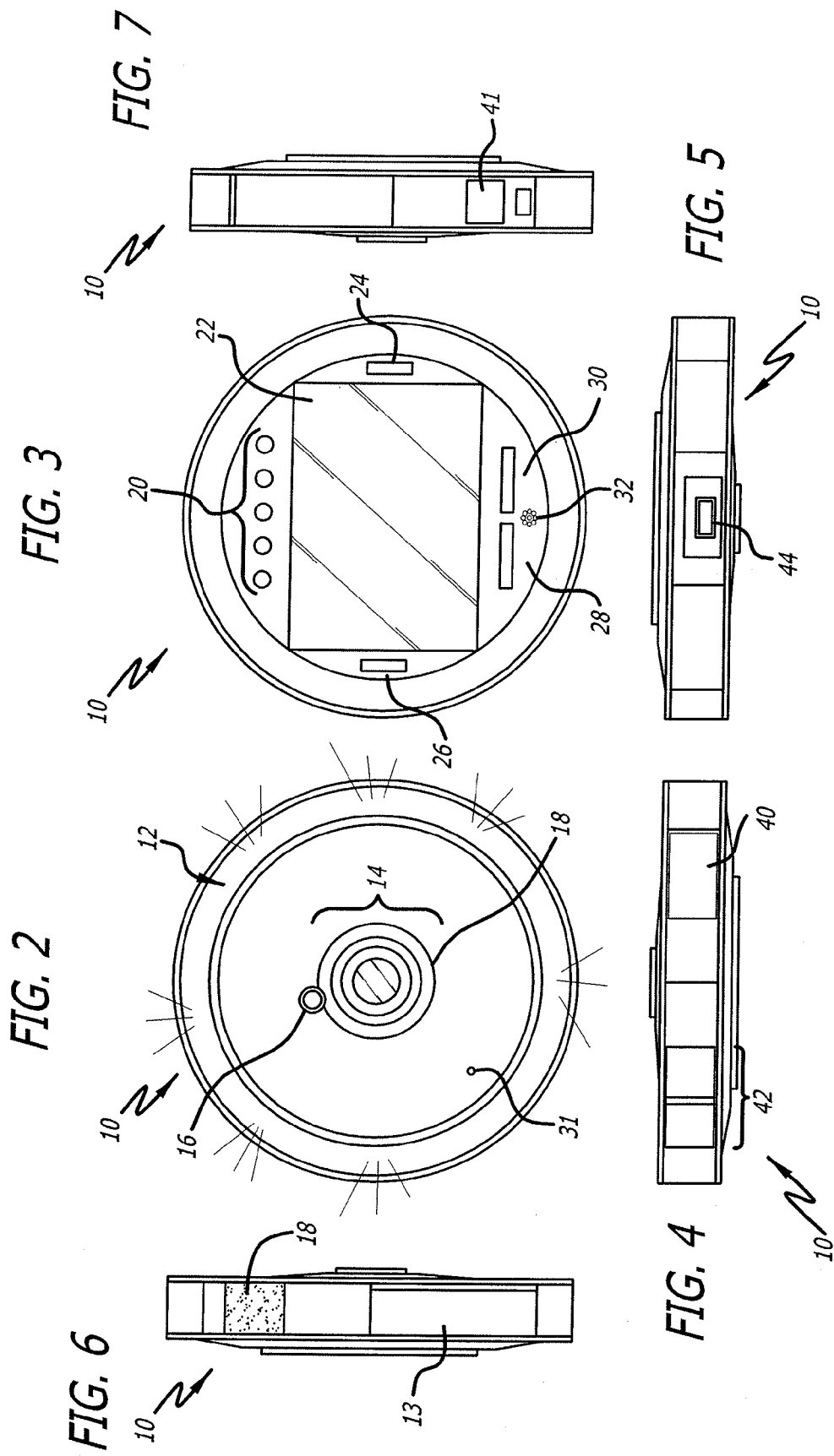

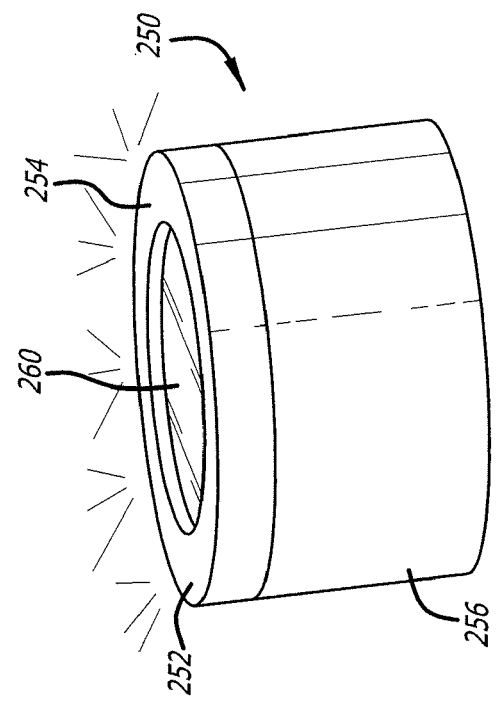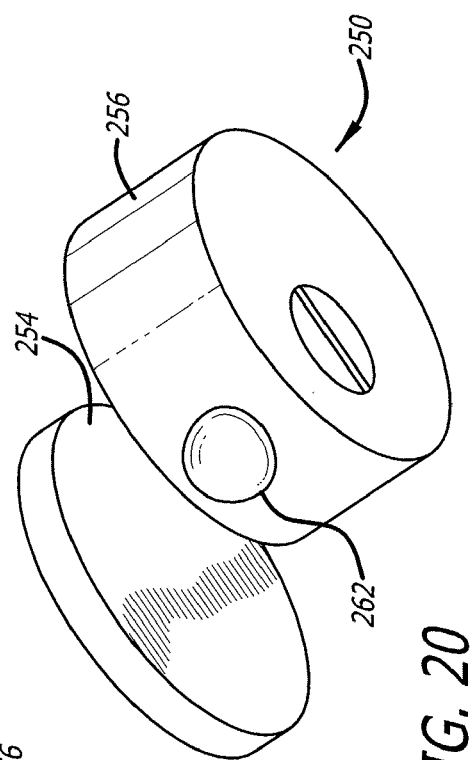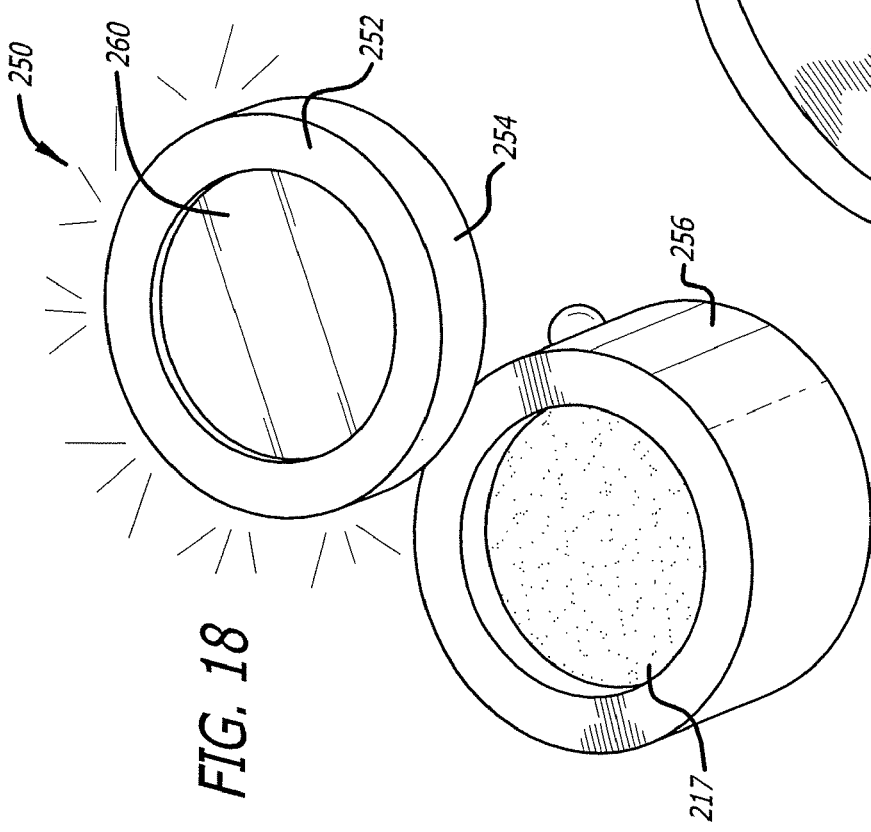

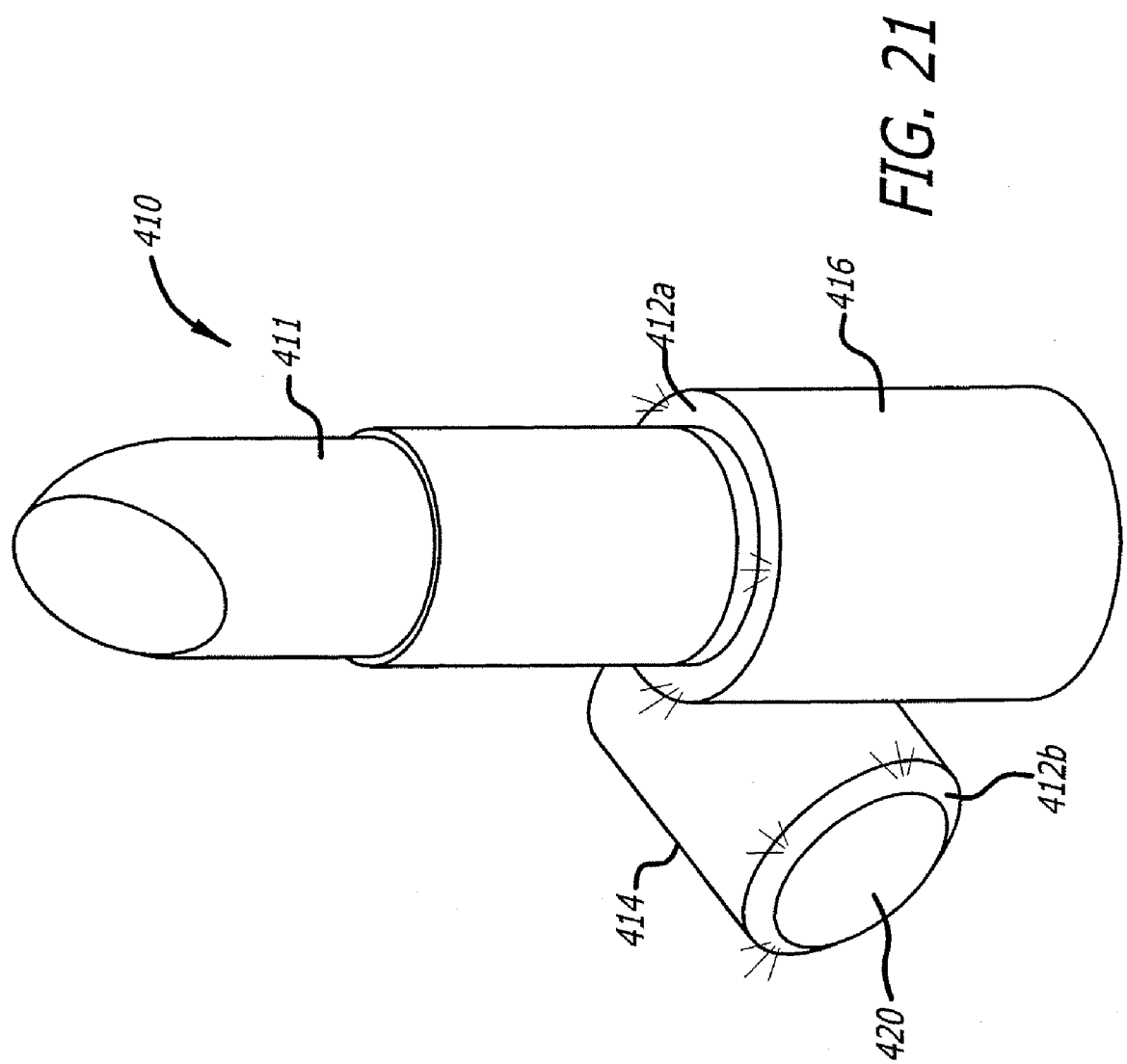

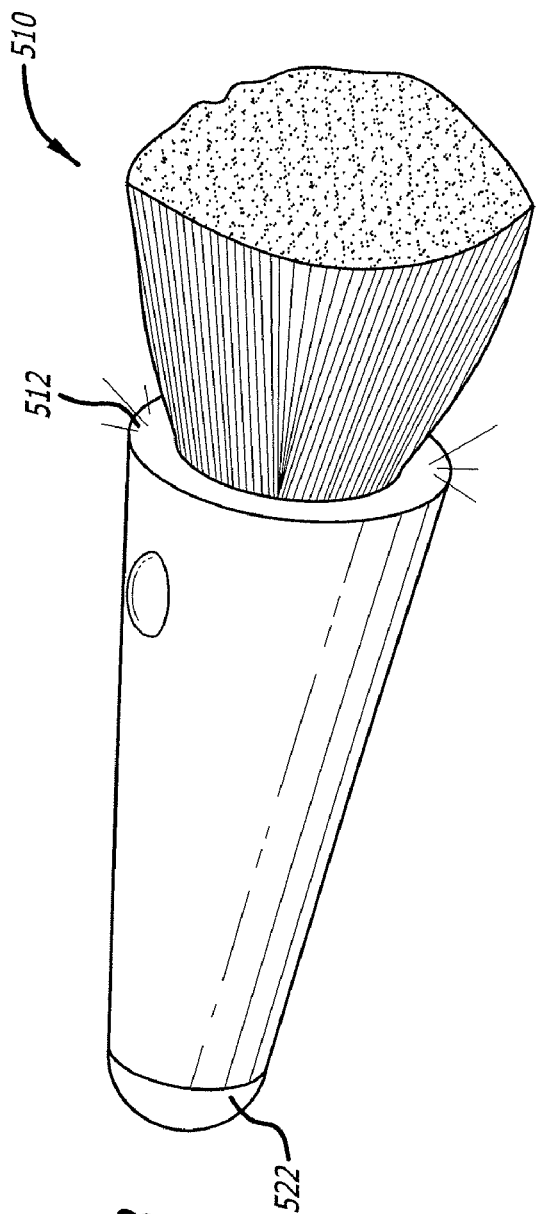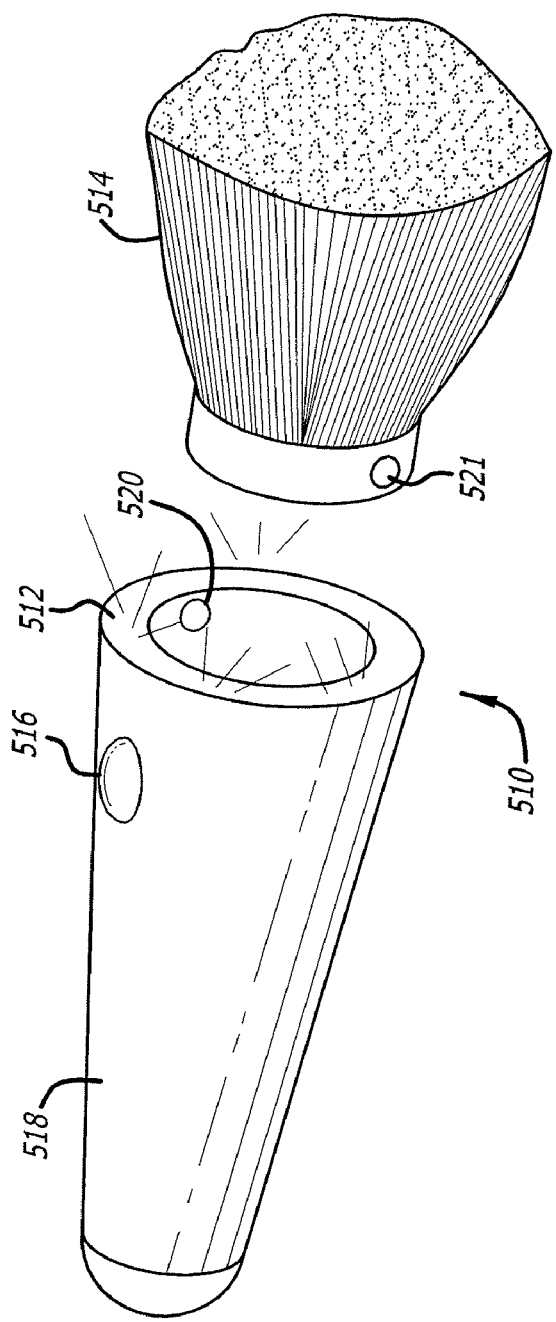
FIG. 23
FIG. 24

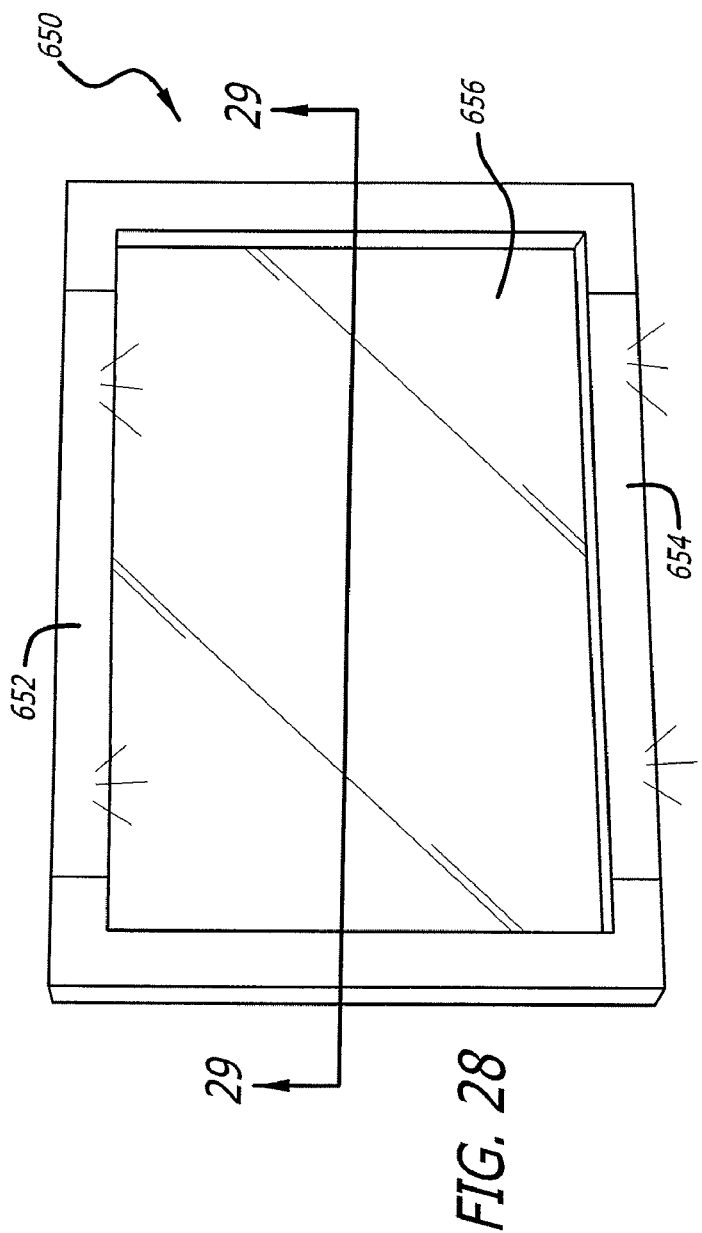
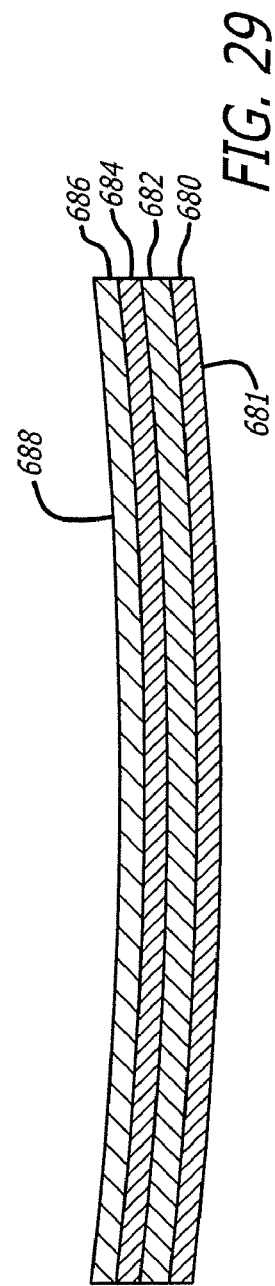

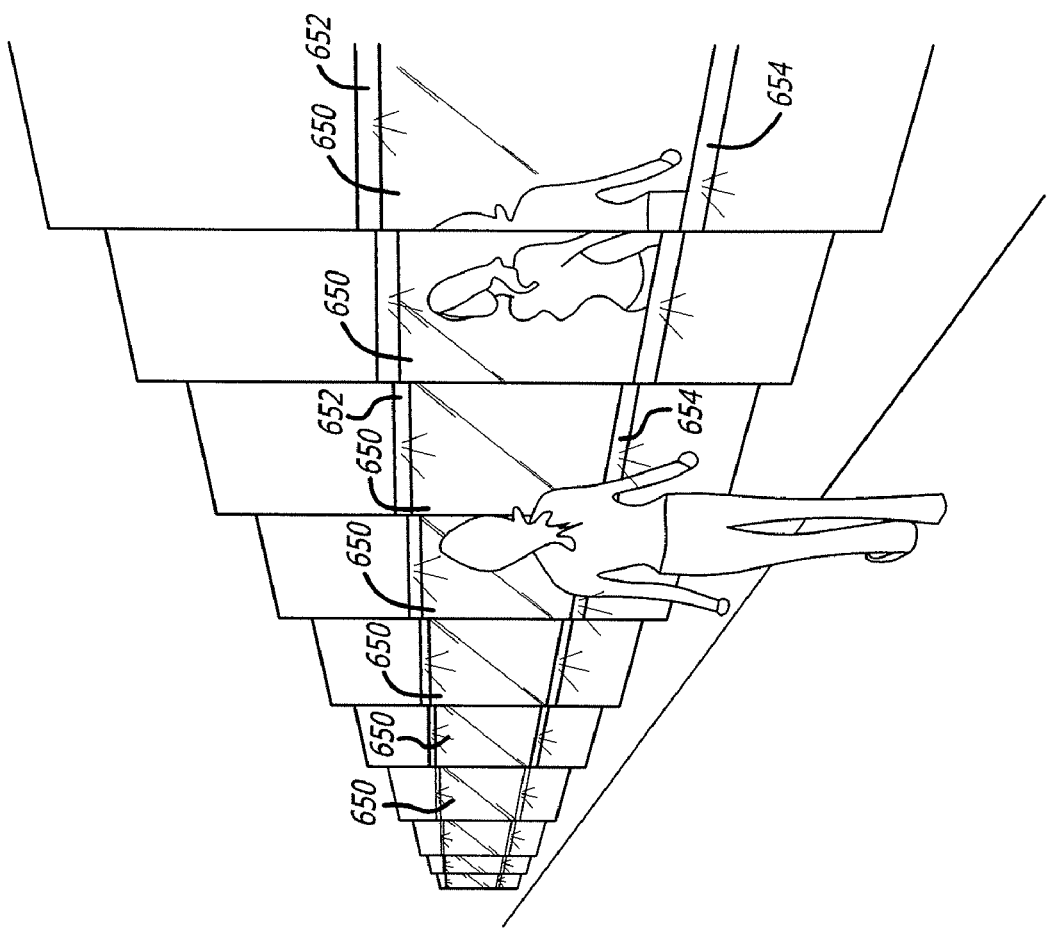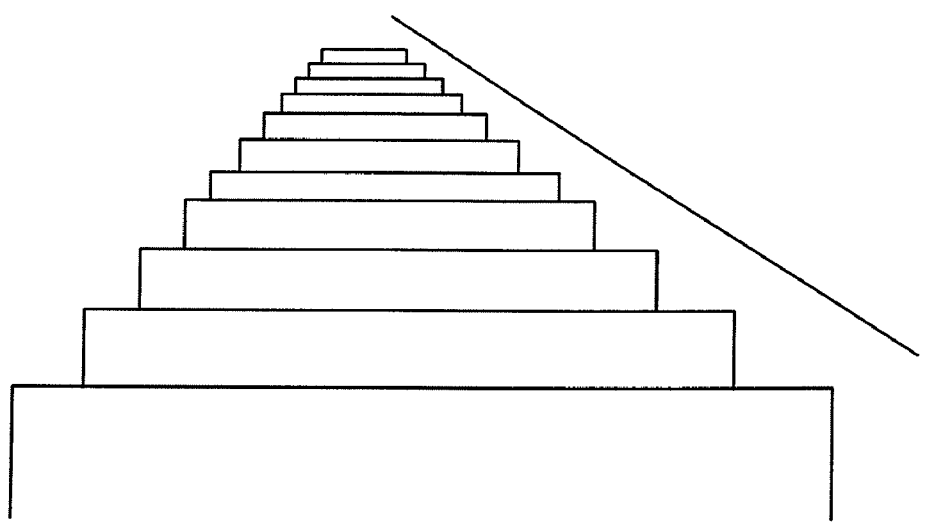
FIG. 30

CAMERA WITH OPERATION FOR MODIFYING VISUAL PERCEPTION

CROSS-REFERENCE TO RELATED APPLICATIONS

This application claims the benefit of U.S. provisional patent application No. 60/965,696, filed Aug. 20, 2007, which is herein incorporated by reference in its entirety.

Embodiments disclosed herein generally relate to a system and method for modifying the visual perception of images and/or subjects.

BACKGROUND

Over the years, various techniques and methods have been implemented to aid in a person's quest to look and feel beautiful. For example, cosmetics, fashion and even surgical procedures have been used to increase the beautification process and improve people's perception of beauty. However, there remains a need for a system and method for enhancing the perceived visual perception of a person.

SUMMARY

Briefly, and in general terms, various embodiments directed to a system and method for modifying the appearance of a targeted subject. More particularly, various embodiments are directed enhancing the visual perception of a subject. One embodiment is directed to a camera comprising a camera body and a lens system for capturing images, wherein at least a portion of the lens system is positioned on the outer surface of the camera body. A lighting system is positioned on the outer surface of the camera body and is proximate to the lens system. The lighting system provides key light above the lens system and provides fill light below the lens system. A processor is housed within the camera body. The processor controls one or more operations of the camera including automatically enhancing the captured images. A display is presented on the outer surface of the camera body and displays the automatically enhanced images.

Another embodiment is directed to a video camera mirror system for enhancing visual perception. The video camera mirror system comprises a high definition video display configured to mimic a mirror reflection, wherein the high definition video display has an outer perimeter. A lighting system surrounds the outer perimeter of the video display. The lighting system provides key light above the high definition video display and provides fill light below the high definition video display. A camera is embedded behind the video display and the embedded camera captures moving images. A processor is operatively connected to the camera and is configured to automatically enhance the captured images and display the enhanced images as a mirror reflection on the video display.

Yet another embodiment is directed to a seating system for use in enhancing visual perception. The seating system comprises a housing configured to reduce ambient noise and a seat positioned within the housing. A video camera mirror is positioned in the housing opposite the seat and is configured to mimic a mirror reflection. The video camera mirror includes a high definition video display, a lighting system positioned to surround the outer perimeter of the high definition video display, a camera embedded behind the video display to capture moving images, and a processor to automatically enhance the captured images and display the enhanced images as a mirror reflection on the video display.

Another embodiment is directed to a cosmetic package comprising a top cover pivotally attached to a bottom cover. A mirror is attached to the top cover, wherein the mirror is surrounded by a lighting system. An interchangeable pan is removably contained in the bottom cover.

In another embodiment, a lipstick packaging comprises a container having an open end and a closed end, wherein the container is configured to hold a tube of lipstick. The lighting system is positioned along a ridge portion of the container and the lighting system provides a light source in the direction of the open end of the container. A cap is configured to removably connect to the open end of the container, and a mirror is positioned on the cap.

Another embodiment comprising a polarized mirror having a mirror display. The mirror display comprises a mirrored surface and a diffusion material layered over the mirrored surface. A glass material is layered over the diffusion material and a polarized filter is layered over the glass surface. Key light is positioned over the mirror display and fill light is positioned beneath the mirror display.

In another embodiment, an illuminated cosmetic brush comprises a brush head and a handle configured to removably connect to the brush head via an attachment point. A lighting system surrounds the handle and directs lighting around the brush head.

Another embodiment is directed to a personal portrait photography management system comprising an image capturing device having a lens and a lighting system surrounding the lens of the image capturing device. The lighting system provides key light above the lens and provides fill light below the lens. A processor, operatively connected to the image capturing device, analyzes the captured images and automatically enhances the captured images. The automatically enhanced images are displayed on a display.

Another embodiment is directed to an illumination system for modifying visual perception. The system comprises one or more key lights positioned within the interior of the room and one or more fill lights positioned within the interior of the room. A processor is operatively connected to each of the one or more key lights and to each of the one or more fill lights, wherein the processor is configured to control the operation of the lights. A sensor is operatively connected to the processor, and the sensor is configured to detect color quality information from a target image and use the information to adjust at least one of the key and fill lights to adjust the lighting tone.

These and other features and advantages will become apparent from the following detailed description, taken in conjunction with the accompanying drawings, which illustrate by way of example, the features of the various embodiments.

BRIEF DESCRIPTION OF THE DRAWINGS

FIG. 2 is a front view of one embodiment of the camera.
FIG. 3 is a back view of one embodiment of the camera.
FIG. 4 is a top view of one embodiment of the camera.
FIG. 5 is a bottom view of one embodiment of the camera.
FIG. 6 is a side view of one embodiment of the camera.
FIG. 7 is an alternate side view of one embodiment of the camera.

FIG. 18 is an example illustration of one embodiment of cosmetic packaging in accordance with an embodiment of modifying visual perception.

FIG. 19 is another view of the cosmetic packaging in accordance with an embodiment of modifying visual perception.

FIG. 20 is yet another view of the cosmetic packaging in accordance with an embodiment of modifying visual perception.

FIG. 21 is an example illustration of lipstick packaging in accordance with an embodiment of modifying visual perception.

FIG. 23 is an example illustration of an illuminated brush system in accordance with an embodiment of modifying visual perception.

FIG. 24 is another view of the illuminated brush system.

FIG. 28 is an example illustration of a polarized mirror in accordance with an embodiment of modifying visual perception.

FIG. 29 is a cross section view of the polarized mirror in FIG. 28 taken along line 29.

FIG. 30 is an example illustration of multiple polarized mirrors for use in accordance with an embodiment of modifying visual perception.

DETAILED DESCRIPTION

Figure 1:
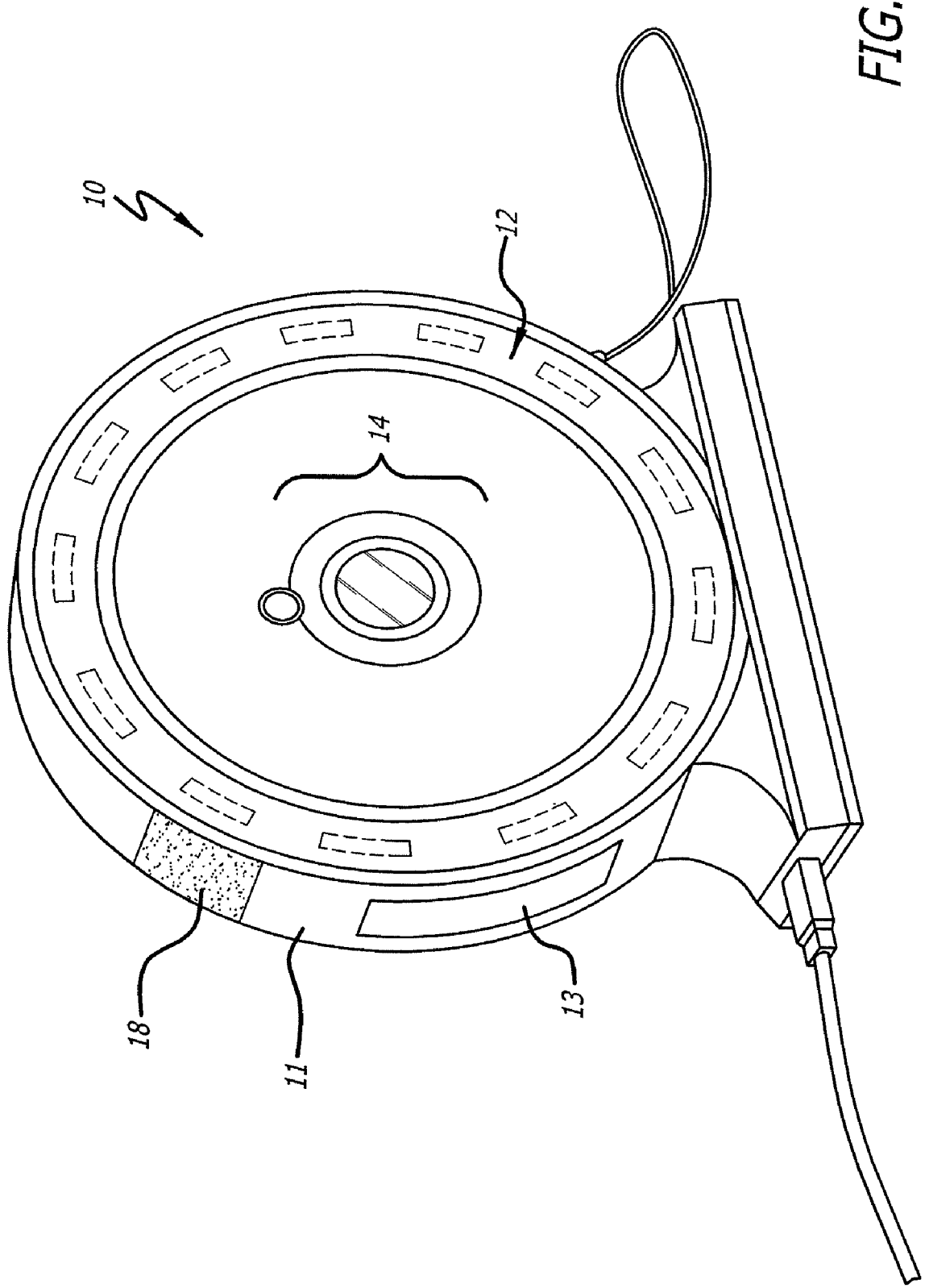
FIG. 1 is an example illustration of a camera for use in accordance with an embodiment of modifying visual perception.

Various embodiments disclosed herein are directed to modifying visual perception. More particularly, various embodiments employ lighting techniques to modify the appearance of a subject, such as a person, place or thing. Additionally, lighting techniques in combination with real time modification features may be applied to electronically captured imagery. Additionally, lighting placement and positioning techniques may be further incorporated to modify and/or enhance the appearance of a targeted subject.

Various lighting techniques may be used to affect the physical appearance of a targeted subject or location. In particular, a combination of key light and fill light may be used to modify the appearance of the subject (e.g., the person, place or thing). Generally, key light is used to highlight and/or shape the form and dimension of a subject. In comparison, fill light is typically used to "fill in" the shadows caused by the main light (or the key light). Typically, the fill light is softer and less intense than the key light. However, in some situations a key light and fill light of equal intensity may be applied to create a particular enhanced cosmetic effect. The application of key and fill light in combination may produce the illusion of light emanating from within a center point, as opposed to the appearance that light is being applied to a person, place or thing. Additionally, in order to produce the illusion of light emanating from within, various factors such as ratios of key and fill light, placement of key and fill light, and relationship of positioned key and fill light to each may be manipulated to enhance the illusion.

The system and method for modifying visual perception may be applied and utilized in a variety of formats and features. Referring now to the drawings, wherein like reference numerals denote like or corresponding parts throughout the drawings and, more particularly to FIGS. 1-34, there are shown various embodiments of applications using lighting techniques to modify visual perception.

In one example embodiment, the system and method for modifying visual perception is applied to a camera. More particularly, the camera is targeted for general consumer use and provides both key and fill lighting features in the same camera. Referring now to FIG. 1, a camera 10 having a lighting system 12 is shown. In one embodiment, the body of camera 10 has a round shape (as shown in FIG. 1). However, those skilled in the art will appreciate that any style or shape of camera may be used. The lighting system 12 provides both key and fill light. The lighting system 12 shown in FIG. 1 is illustrated as a circular-shaped light (or ring light) that surrounds the lens system 14. However, those skilled in the art will appreciate that the lighting system 12 may be of any shape. Examples of the shape of the lighting system may include, but is not limited to, a circle, oval, triangle, square, rectangle, polygon, or any other geometric shape known to those skilled in the art. Additionally, those skilled in the art will appreciate in some embodiments, the lighting system 12 is not confined to a defined shape. More particularly, the lighting system 12 could be configured to be in the shape of a star, heart, flower or any other design that could be used to surround the lens system 14. Additionally, in an optional embodiment (not shown), the light source may be a multi-component lighting system. For example, the lighting system could include a first light source positioned above the lens system 14 (acting as the key light) and a second light source positioned below the lens system 14 (acting as the fill light). Further, in one embodiment, the lighting system 12 is a constant light source. Optionally, in an alternate embodiment, the lighting system 12 is a flash light source. Alternately, in an optional embodiment, the lighting system 12 is configured to act as either a constant light source or a flash light source.

In FIG. 2, a front perspective the camera 10 is shown. In one embodiment, the camera 10 includes a lens system 14. The lens system 14 may include an auto focus lens 16 and a zoom lens 18.

Referring now to FIG. 3, a back perspective of the camera 10 is shown. The camera 10 includes a display 22. Those skilled in the art will appreciate that display 22 may be a display screen of any shape, size, clarity or definition. In one embodiment, the display 22 is a LCD display. Additionally, the camera 10 includes various user input mechanisms and controls to allow the user to operate the camera. Those skilled in the art will appreciate that the input mechanisms may be in the form of buttons, dials, sliders, toggles, touch screen input, and any other known input devices. For example, in one embodiment, the camera 10 includes light temperature controls 20, in the form of buttons, wherein a user depresses a button to select the desired particular light setting. The light temperature controls 20 may include a button for each of the following light settings: a cool light setting, a neutral light setting, a warm light setting, a sepia setting and a black and white image setting. Additionally, the camera 10 includes various other buttons to aid a user in directing camera functions. More particularly, in one embodiment, buttons 24 and 26 are provided and may be configured to operate a viewing function of the display screen 22. For example, the user may depress buttons 24 and 26 to scroll through and view stored images. More particularly, the button 24 may scroll through the stored images in a backward direction and button 26 may scroll through the stored images in a forward direction. Additional buttons may be used to operate other features. For example, buttons 28 and 30 may be provided to allow a user to "accept" or "reject" a captured image. Those skilled in the art will appreciate that the buttons may be used to operate more than one function, and the above described examples were presented for illustrative purposes only.

Additionally, in optional embodiments, the camera 10 includes one or more control mechanisms that allow images to be recorded. Additionally, the recorded image (and associated data) maybe stored. Those skilled in the art will appreciate the recorded image is stored in a memory storage device such as, but not limited to, internal memory drive, removable memory device, external memory, flash drive, memory card and any other known device for storing data.

Additionally, the camera 10, may also include the ability to transmit captured and/or stored images. Optionally, in one embodiment, the images may be transmitted wirelessly. Additionally, the images and/or data may be transmitted and received in real time. Further, the camera 10 may also transmit and receive streaming data. Those skilled in the art will appreciate that a processor housed within the camera 10 will control the operation of transmitting, receiving, storing and/or capturing data.

The camera 10 may include various additional control mechanisms positioned in any suitable location on the camera 10. For example, the camera 10 may include a power switch on the outer surface of the camera 10. Referring to FIG. 4, an example embodiment is shown in which a power switch 40 is located on the top portion of the camera 10. Additionally, an input mechanism 42 for controlling a zoom feature of the lens system 14 is also positioned on the top portion of the camera 10. Those skilled in the art will appreciate that the above described control mechanisms may be located anywhere on the camera 10. The camera 10 may further include input/output ports. For example, FIG. 5 illustrates a connection port 44 positioned on the bottom side of the camera 10. The connection port 44 may be used to connect the camera 10 to a docking port or to a battery charger (not shown in FIG. 5). Optionally, in one embodiment, data may be transferred to and from the camera 10 via the connection port 44. Additionally, in an alternate embodiment, data may be wirelessly transferred to and from the camera 10.

Alternately, in an optional embodiment, the camera 10 includes a compartment 41 for assisting in the transfer of data. In one embodiment, the compartment 41 includes a communication port for transferring data. For example, the compartment 41 may include one or more of the following: an AV out port, a firewire port, a USB port, or any other known communication port.

Referring back to FIG. 1, in one embodiment the outer circumference area 11 of the camera 10 may include a non-slip textured grip surface 18. The entire surface of the outer circumference area 11 may be covered in a non-slip textured grip material. Alternately, one or more portions of the outer circumference area may be covered with the non-slip textured grip surface. Additionally, the camera 10 may include a first compartment 13 for housing both a battery and a removable memory device. Optionally, in an alternate embodiment the camera 10 may include a battery compartment (not shown) and a separate memory compartment (not shown).

Additionally, the camera 10 may include the ability to capture moving images, or video. The video may be stored in a permanent memory within the camera, or optionally, the video may be stored in a portable memory device. Further, in an optional embodiment, the video may be wirelessly transferred to and from the camera 10.

The camera 10 may further include audio capabilities and may record and play back audio data. For example, the camera 10 may include a microphone 31 (see FIG. 2) for recording sound. Additionally, the camera 10 may include a speaker 32 (see FIG. 3) for transmitting recorded sound. The audio may be stored on a permanent memory device, or alternately on a portable memory device. The audio data may be wirelessly transferred to and from the camera 10.

Figure 8:
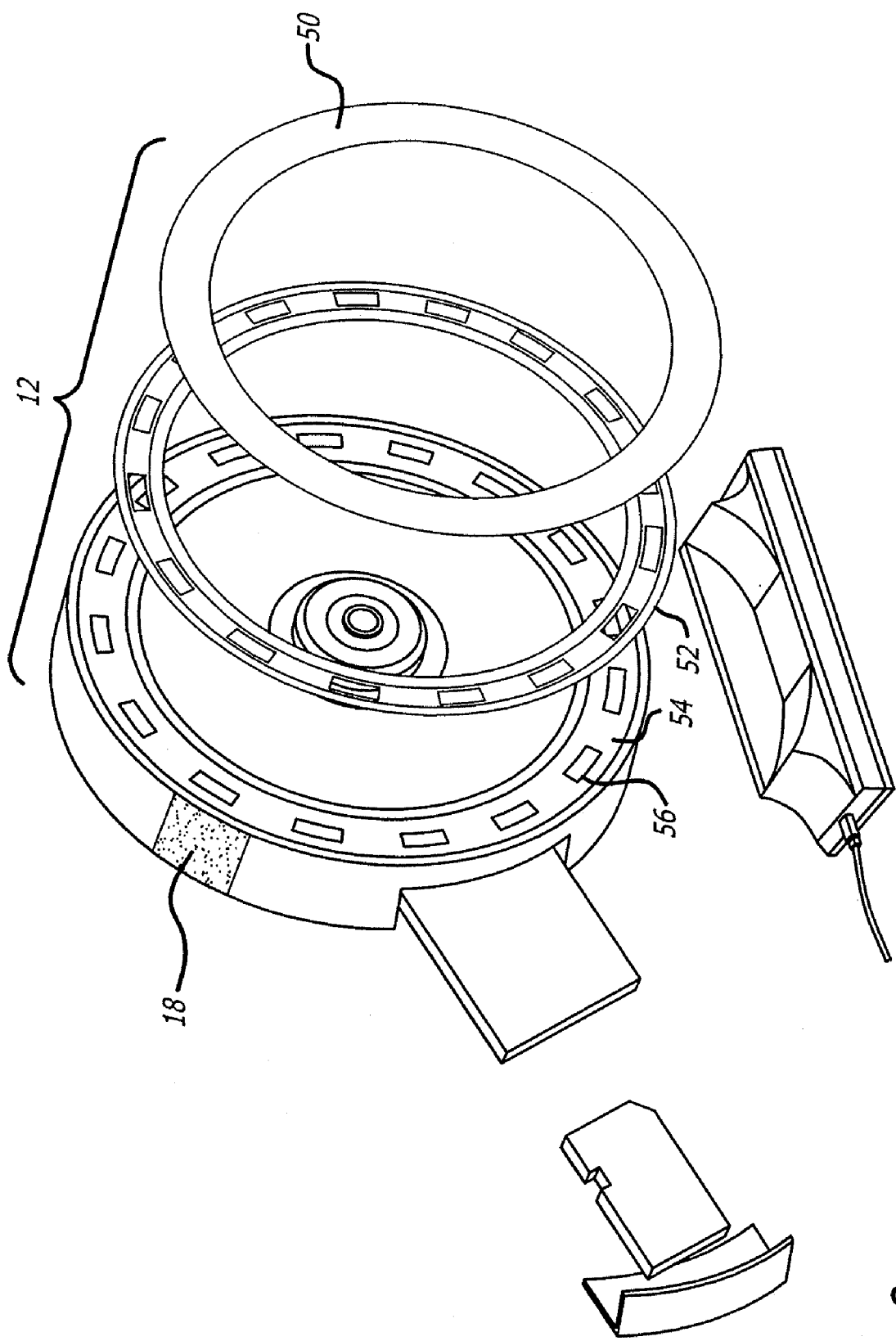
FIG. 8 is an example illustration of various components of the lighting system incorporated into one embodiment of the camera.

In an optional embodiment, the lighting system 12 is a lighting system that includes multiple components. Referring to FIG. 8, the lighting system 12 comprises a diffuser 50, a reflector 52 and a light source 54. The diffuser 50 assists in modifying visual perception by softening shadows and reducing contrast, thereby modifying, and enhancing the cosmetic effect of the resulting captured image. Optionally, in one embodiment, the diffuser 50 may contain color temperature correction filters, polarizing filters and multiple layers of diffusion materials that vary in intensity. A variety of materials may be used to create the diffuser, including, for example, but not limited to, glass, plastics, resins, fiberglass, ceramic or paper or any combination of these materials.

The reflector 52 is a component of the lighting system 12 that may be used to reflect light and increase brightness and contrast. Reflectors are generally very effective in boosting the power of the light source and in focusing and shaping the light itself. The reflector 52 may be composed of a variety of materials, such as, but not limited to, mirrored glass, metallic plastics, resins and highly polished metals or any combination of these compounds and materials.

Additionally, the lighting system 12 may also include screens (not shown) and/or filters (not shown) to further manipulate lighting effects. For example, the color of the resulting emitted light may be manipulated by using particular screens and/or filters. In one embodiment, a series of color correction filters corresponding to a range of colors similar to PANTONE® colors 472C, 723C, 1485C, and 1555C may be used to control and warm the light. Those skilled in the art will appreciate that the PANTONE® color reference system is frequently used to specify color by designers and printers. Those skilled in the art will appreciate that other filters of other colors may be used to control the light. For example, filters that replicate the effect of GAMPRODUCT, INC® colors 325(Bastard Amber), 328 (Tan Tone), 360 (Amber Blush), and 380 (Golden Tan) may also be used. Those skilled in the art will appreciate that GAMCOLOR® is a series of commercially available color filters used to correct motion picture and video lighting. The GAMCOLOR® filters are typically used in the form of flexible polyester gels that are applied directly to lamps in sheet form, or wrapped around fluorescent lamps in tube form. The above listed GAM-COLOR® number references represent color temperatures and hues of the actual light that may be replicated in one embodiment of the camera 10. The camera 10 may employ filters and/or lighting to modify the coloring. Optionally, the camera 10 may capture an image, and then a microprocessor may perform a color adjustment to captured image. Additionally, in another optional embodiment, polarizing filters may also be used to add contrast and shape to the light.

The lighting system 12 also includes a light source 54. In one embodiment, the light source 54 includes a plurality of light-emitting diodes 56 (LEDs) positioned in a circular path. Other examples of light sources may include, but are not limited to incandescent light bulbs, arc lamps, gas discharge lamps, neon lamps, flood lamps, modern photographic flashes, lasers, organic light-emitting diodes (OLEDs), sulfur lamps, and any other known light sources.

The camera 10 may be used to capture images of target subjects. In one embodiment, the camera 10 has a defined minimum and maximum target distance in order to capture optimal quality images. Optionally, in one embodiment, the optimal distance for the camera 10 to capture an image of an object/target is between one foot and seven feet. The camera 10 further includes a system for automatically modifying captured images. In one embodiment, under the control of a user, the camera 10 "takes a picture" or captures an image. The captured image is modified automatically. Optionally, in one embodiment, the captured image is automatically modified in real time. The term "real time" is used to mean occurring immediately. More particularly, the camera captures the images and responds immediately to enhance and modify the image immediately. Typically, real time can refer to events simulated by a computer at the same speed that they would occur in real life.

In one embodiment, the captured image, also referred to as the "non-manipulated capture" is examined and analyzed by the automatic modification process. The automatic modification process evaluates the non-manipulated capture and automatically adjusts various features of the image. Additionally, the automatic modification process applies an automatic overall adjustment to the entire non-manipulated capture. Further, in one example, the automatic modification process may include one or more of the following adjustments: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing the image, and elongating the image.

In one embodiment, the automatic modification process adjusts the exposure level to define shadow detail such as detail in dark hair. In one example embodiment, the automatic exposure adjustment includes increasing the exposure levels between approximately 5% and approximately 25% of the non-manipulated capture.

In one embodiment, the automatic modification process adjusts the highlight levels to brighten the lightest areas in the captured image, such as the shine on the skin of a person. In one example embodiment, the automatic highlight level adjustment includes increasing the highlight levels between approximately 5% to approximately 10% of the non-manipulated capture.

In one embodiment, the automatic modification process adjusts the midtone levels to brighten "middle tone" areas such as skin tone. In one example embodiment, the automatic midtone level adjustment includes increasing the midtone levels between approximately 5% to approximately 10% of the non-manipulated capture.

In one embodiment, the automatic modification process adjusts the lowlight levels to darken the deepest areas of exposure such as the dark pupil of the eye. In one example embodiment, the automatic lowlight level adjustment includes decreasing the lowlight levels between approximately 5% to approximately 10% of the non-manipulated capture.

In one embodiment, the automatic modification process adjusts the color temperature to create a golden color quality. For example, the color temperature may be adjusted to create the effect of warming the skin tone with golden hues. In one example embodiment, the automatic color temperature adjustment includes increasing the yellow tones between approximately 50% to approximately 150% of the non-manipulated capture, and thereby decreasing the blue tones between approximately 50% to approximately 150% of the non-manipulated capture. Optionally, in an alternate embodiment, the automatic color temperature adjustment is performed in combination with an adjustment of the tint.

In one embodiment, the automatic modification process adjusts the tint to decrease red tones and increase green tones. Optionally, the automatic tint adjustment may be performed in combination with the color temperature adjustment to produce a golden color quality in a picture. In one example embodiment, the automatic tint adjustment includes decreasing the red tones (and thereby increasing the green tones) between approximately 5% to approximately 10% of the non-manipulated capture.

In one embodiment, the automatic modification process adjusts the contrast of the overall image. The contrast controls the differential between light and dark tones. In one example embodiment, the automatic contrast adjustment includes increasing the contrast between approximately 50% to approximately 150% of the non-manipulated capture. Optionally, the automatic contrast adjustment may be performed in combination with an adjustment of the color saturation and/or an automatic diffusion modification in order to produce a more colorful and vivid picture.

In one embodiment, the automatic modification process adjusts the color saturation of an image. The color saturation controls the amount of color in an image. Generally, as saturation increases, colors tend to take on a kind of neon look. As saturation decreases, colors tend to approach a gray. In one example embodiment, the automatic color saturation adjustment includes increasing the color saturation between approximately 50% to approximately 150% of the non-manipulated capture. Optionally, the automatic color saturation adjustment may be performed in combination with a contrast adjustment and/or an automatic diffusion modification in order to produce a more colorful and vivid picture.

In one embodiment, the automatic modification process includes an automatic diffusion modification which softens the midtone areas, such as the skin. In one example, diffusing the midtones produces the effect of smoothing and softening the appearance of skin texture. In one example embodiment, the automatic diffusion modification diffuses midtones between approximately 5% to approximately 100% of the non-manipulated capture. Optionally, in an alternate embodiment, midtone diffusion is performed in combination with a contrast adjustment and/or color saturation adjustment.

In one embodiment, the automatic modification process includes automatic highlight sharpening which sharpens the detail in the brightest of the highlight areas. In other words, the appearance of extra sharpness is added only to the brightest parts of the exposure, such as highlights and light reflections in the eyes and teeth. In one example embodiment, the highlight sharpening is increased between approximately 5% to approximately 10% of the non-manipulated capture.

In one embodiment, the automatic modification process includes an image compression function. For example, the image may be compressed, or squeezed, horizontally (or in one example, compressed along the x-axis) so that people or objects in the resulting compressed image appear slimmer. In one example embodiment, the image is compressed between approximately 5% to approximately 10% of the non-manipulated capture.

In one embodiment, the automatic modification process includes an image extension function. For example, the image may be elongated, or extended, vertically (or in one example, elongated along the y-axis) so that people or objects in the image appear stretched or elongated, thus appearing taller. In one example embodiment, the image is extended between approximately 5% to approximately 10% of the non-manipulated capture.

Those skilled in the art will appreciate that the automatic modification process may include additional automatic features. For example, in one embodiment, the hue may be automatically modified. Alternately, in another example embodiment, the luminance, or brightness of color, may be automatically modified. Additionally, in an optional embodiment, the image reflectivity may also be automatically modified. In another optional embodiment, the transparency parameter may be automatically modified.

Additionally, in one embodiment, the automatic modification process may be configured to achieve a particular visual look or appearance. In one example embodiment, the camera 10 is may be used to capture close-up shots and/or wide-shots, and the camera 10 may be configured to automatically modify the captured images to obtain a particular look. Generally, a close-up shot closely frames an object, such as a human figure, such that only the portion of the person from the waist or chest up is included in the frame. Additionally, the close-up shot may include just the face of a person. A wide-shot (also called a long shot) typically shows the entire object or human figure and is usually intended to place it in some relation to its surroundings. In one example embodiment, the camera 10 is used to capture a close-up shot of an image such that the resulting captured image is automatically modified and appears to have a peach-golden look. Those skilled in the art will appreciate that the "peach-golden look" is illustrated below by way of example only and not by way of limitation. In one example, the camera 10 captures a close-up shot and the automatic modification process automatically increases the exposure level of the captured image by approximately 10%, increases the highlight levels of the captured image by approximately 7%, increases the midtone levels of the captured image by approximately 7%, decreases the lowlight levels of the captured image by approximately 7%, adjusts the color temperature by increasing the yellow tones (and thereby decreasing the blue tones) by approximately 75%, adjusts the tint by decreasing the red tones (and thereby increasing the green tones) by approximately 7%, increases the contrast by approximately 75%, increases the color saturation by approximately 75%, diffuses the midtones by approximately 50%, increases the highlight sharpening by approximately 7%, compresses the image by approximately 5%, and extends the image by approximately 5%.

Alternately, in another example embodiment, the camera 10 is used to capture a wide-shot image such that the resulting captured image is automatically modified and appears to have a peach-golden look. Those skilled in the art will appreciate that the "peach-golden look" is illustrated below by way of example only and not by way of limitation. In this example, the camera 10 captures a wide-shot and the automatic modification process automatically increases the exposure level of the captured image by approximately 7%, increases the highlight levels of the captured image by approximately 5%, increases the midtone levels of the captured image by approximately 5%, decreases the lowlight levels of the captured image by approximately 5%, adjusts the color temperature by increasing the yellow tones (and thereby decreasing the blue tones) by approximately 50%, adjusts the tint by decreasing the red tones (and thereby increasing the green tones) by approximately 5%, increases the contrast by approximately 50%, increases the color saturation by approximately 50%, diffuses the midtones by approximately 25%, increases the highlight sharpening by approximately 5%, compresses the image by approximately 2.5%, and extends the image by approximately 2.5%.

In one optional embodiment, the peach-golden look appears to include colors and hues in the range of peach, golden and nude tones. Examples of such colors and tones include, but are not limited to, PANTONE® colors 472C, 723C, 1485C, and 1555C. Likewise, the following listed GAMCOLOR® numbers refer to commercially available colors and hues in range of peach, golden and nude tones that may be used to replicate the color temperature and hue produced in one embodiment of the peach-golden look: 325 (Bastard Amber), 328 (Tan Tone), 360 (Amber Blush), and 380 (Golden Tan). Those skilled in the art will appreciate that additional colors and/or any combination may of course be used.

Those skilled in the art will appreciate that the lighting and automatic modification process may be manipulated and controlled to achieve various other looks. For example, a yellow-green look may be automatically produced. One embodiment of the yellow-green look may appear to include colors and hues in a range of yellow, green and olive tones. Examples of such colors and tones include, but are not limited to, PANTONE® colors 108C, 111C, 116C, and 1485C. Likewise, the following GAMCOLOR® numbers are examples of colors and hues in the range of yellow, green and olive tones that may be used to replicate the color temperature and hue produced in one embodiment of the yellow-green look: 385 (Light Amber), 450 (Saffron), and a combination of 455 (Yellow Sun) and 570 (Light Yellow Green). Those skilled in the art will appreciate that additional colors and/or any combination may of course be used.

In another example, a turquoise look is automatically produced. One embodiment of the turquoise look may appear to include colors and hues in a range of turquoise, lavender, and nude tones. Examples of such colors and tones include, but are not limited to, PANTONE® colors 3125C, 3115C, 5025C, and 530C. Likewise, the following GAMCOLOR® numbers are examples of colors and hues in the range of turquoise, lavender, and nude tones that may be used to replicate the color temperature and hue produced in one embodiment of the turquoise look: 690 (Bluegrass), 725 (Princess Blue), 980 (Surprise Pink), and 328 (Tan Tone). Those skilled in the art will appreciate that additional colors and/or any combination may of course be used.

In another illustrative example, a blue-brown-rose look may be automatically produced. One embodiment of the blue-brown-rose look may appear to include colors and hues in a range of blue, brown, and rose tones. Examples of such colors and tones include, but are not limited to, PANTONE® colors 2915C, 479C, 480C, and 4625C. Likewise, the following GAMCOLOR® numbers are examples of colors and hues in the range of blue, brown, and rose tones that may be used to replicate the color temperature and hue produced in one embodiment of the blue-brown-rose tones look: 785 (Beverly Blue), 780 (Shark Blue), 328 (Tan Tone), and 330 (Sepia). Those skilled in the art will appreciate that additional colors and/or any combination may of course be used.

Referring back to the camera 10, once a "picture is taken," the resulting image shown on the display screen 22 is an enhanced image, or modified, as it has been automatically modified by one or more of the features described above.

In one example, the camera 10 is used to capture portrait-style photographs of a person. Typically, the camera 10 captures images of a person or persons. Additionally, the camera captures images of a person in a close range distance from the camera. In one embodiment, the optimal distance of the person from the camera is between approximately one and approximately seven feet. However, in an alternate embodiment, the range may be greater.

Once the user is ready to take a picture, the user aims the camera 10 at the subject and "snaps" the shot. In one example, the camera 10 is a classic "point and shoot" digital camera. Optionally, the camera 10 may be a DSLR (digital single lens reflex) camera. Optionally, in an alternate embodiment the camera 10 also includes video capability and may capture video images as well as still images. Alternately, in an optional embodiment, the camera 10 is a video camera. Further, the lighting system 12 generally acts as a constant light source when capturing video. Additionally, in an optional embodiment, the camera 10 may also include audio capability and may capture images as well as audio recordings. Optionally, the camera 10 may capture video images and audio recordings. Further, the camera 10 also includes a playback feature for displaying captured video. In one embodiment, the captured video may be displayed on the display 22. A microphone 31 captures and records sound. Subsequently, a speaker 32 is an outlet for transmitting the recorded sound back to the user.

Once the user has taken a picture, the captured image is then automatically modified in real time and displayed on the display screen 22 of the camera 10. As described above, the real time modifications may include squeezing or compressing the image so that the subject in the image appears slimmer. The real time modification may also include stretching or elongating the image so that the subject in the image appears taller. Further, as described in detail above, other automatic, real time modifications may include automatically manipulating the image so that the mid-tones are diffused (particularly in skin tone areas where the subject is a human), the highlights are sharpened and gold tones may be added. Optionally, in another embodiment, peach golden tones may be added. Additionally, the image may be manipulated by automatically altering brightness levels, contrast and/or the color temperature. The manipulation of the captured image is done automatically in real time so that the captured image presented on the camera display 22 is presented in a modified format and does not require any further input, choices, selections, or decisions from the user. The camera 10 may work in conjunction with a post production system (not shown) that allows for further modification of the captured images. In one embodiment, the post production system includes a software application for use on a computer to be used in combination with the camera 10.

Additionally, in an optional embodiment, the camera 10 further includes an automatic audio modification feature that allows the camera 10 to automatically modify the captured audio data. More particularly, the automatic audio modification feature works in conjunction with a camera 10 that captures moving images (i.e., video images). The automatic audio modification feature may include an equalizer, audio leveler and filter. The equalizer correctly balances high, mid and low ranges areas of the captured audio recording and amplifies midrange for greater clarity.

The filter automatically reduces ambient noise to allow for the cleanest possible voice recording. Additionally, in captured voice recordings, the filter softens hard consonants such as "ch" or "k" sounds and adds crispness to sibilant sounds such as "s", "es", or "is" at the end of words.

The automatic audio leveler automatically adjusts voice recording and broadcast levels. More particularly, the automatic leveler adjust the voice recording by reacting to the user's voice and to the volume changes as the user moves closer or further from the microphone. In one embodiment, the optimal distance of the user from the microphone is from approximately one to approximately seven feet.

In one embodiment, the camera 10 is configured for use as a portrait style camera to capture pictures of people at close range (e.g. 1 to 7 feet). The camera 10 provides an automatic modification feature that captures images, analyzes the captured images and then employs the necessary adjustments to produce and display photographs, without requiring the user to make any choices, selections or decisions. In one embodiment, the automatic modification feature includes a microprocessor (not shown) embedded in the camera 10. The microprocessor analyzes the received images, and facilitates the process for modifying and adjusting the images as needed, in real time.

Alternately, in an optional embodiment, the camera 10 further includes a sensor (not shown) operatively connected to the microprocessor. The sensor reads the skin type of a person or persons about to be photographed. In one example embodiment, the sensor is configured to detect and sense particular qualities of skin from a target image. In particular, the sensor may detect skin coloring, skin type or other skin features and then use the information to adjust the coloring of the lighting system 12 to emit a light that is favorable and flattering to the targeted image. Optionally, in an alternate embodiment, a microprocessor (not shown) is operatively connected to the sensor. The microprocessor performs digital color enhancements to the non-manipulated capture as a direct result of skin data received from the sensor.

In an alternate embodiment, the camera 10 may be used to take pictures of non-human subjects. The camera 10 provides an automatic modification feature that produces visually modified photographs. The camera 10 may be used to take pictures of pets, scenic images, interiors, objects and any other subjects.

Figure 9:
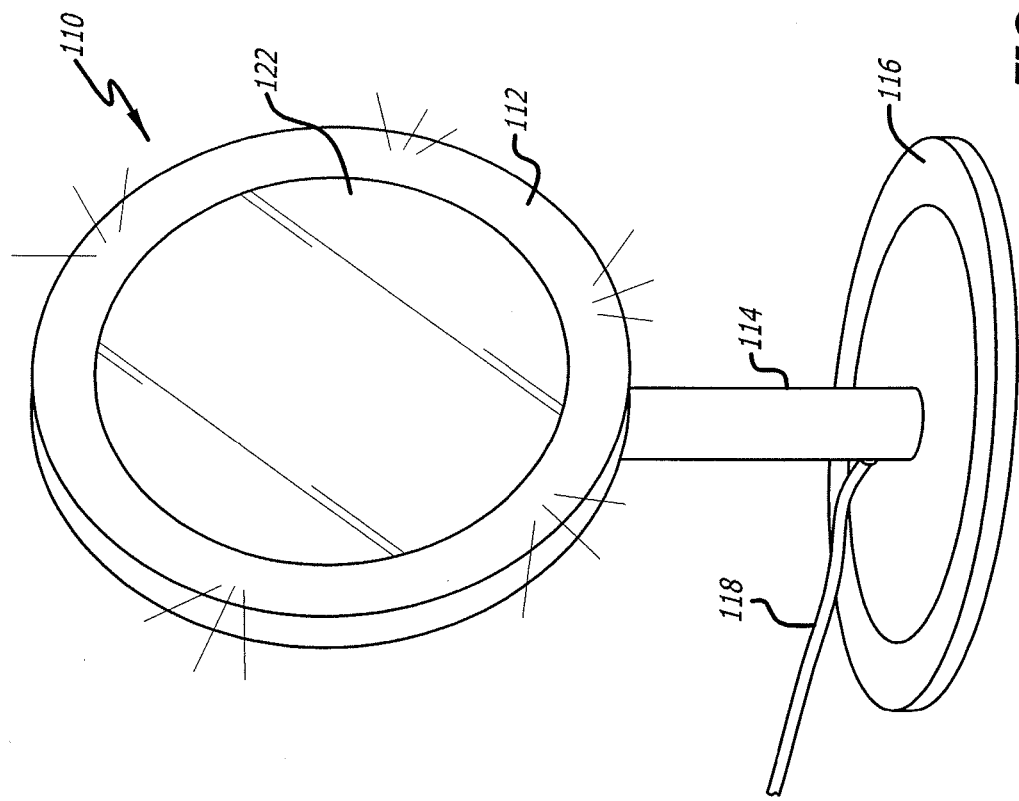
FIG. 9 is an example illustration of a video camera mirror system for use in accordance with an embodiment of modifying visual perception.

In another embodiment, the system and method for modifying visual perception is employed in a video mirror. Referring to FIG. 9, a video camera mirror system 110 is shown. A lighting system 112 provides both key and fill light. In one embodiment, the lighting system 112 surrounds a circular shaped video display 122. Those skilled in the art will appreciate that the video display 122 may be of any shape or size, and the lighting system 112 may be positioned to "surround" a video display 122 of any shape. Additionally, the lighting system 112 may be of any shape, including but not limited to, a circle, square, rectangle, triangle, oval or polygon. Additionally, in an optional embodiment (not shown), the light source may be a multi-component lighting system. For example, the lighting system could include a first light source positioned above the video display 122 (acting as the key light) and a second light source positioned below the video display 122 (acting as the fill light). Further, in one embodiment, the lighting system 112 is a constant light source. Optionally, in an alternate embodiment, the lighting system 112 is a flash light source. Alternately, in an optional embodiment, the lighting system 112 is configured to act as either a constant light source or a flash light source.

Additionally, in an optional embodiment, the video display 122 is a high definition video screen display. The combined lighting system 112 and video display 122 may attach to a stand and base combination. Additionally, the video camera mirror system 110 is configured to appear as a mirror to a user. More particularly, the video display 122 mimics a mirror and provides a simulated reflection of the targeted subject. For example, when a user is positioned in front of the video mirror 110, an embedded camera captures the user's image as video and presents the captured video images on the display screen 122, thus simulating a mirror's reflection. A processing means (not shown) operatively connected to the video camera mirror system 110 automatically modifies the captured video images in real time and presents the modified video to the user on the video display 122.

In one embodiment, a processor evaluates the captured video images and automatically adjusts various features of the video. For example, the automatic modification process may include one or more of the following adjustments to the captured video: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing video images, and elongating video images. The example automatic adjustments were described in great detail above in the camera embodiment and may be applied in a similar fashion to the video camera mirror system 110. The video camera mirror system 110 may capture still images and the processor may automatically adjust the still image. Additionally, the video camera mirror system 110 may also capture moving images (or video images) and the processor may automatically adjust the moving images, or video images, in real time.

The video camera mirror system 110 may also capture and record audio. Additionally, the video camera mirror system 110 may also include an automatic audio modification feature that automatically modifies captured audio data. The automatic audio modification feature may include an equalizer, audio leveler and filter, similar to that described in the camera 10 embodiments above.

Figure 11:
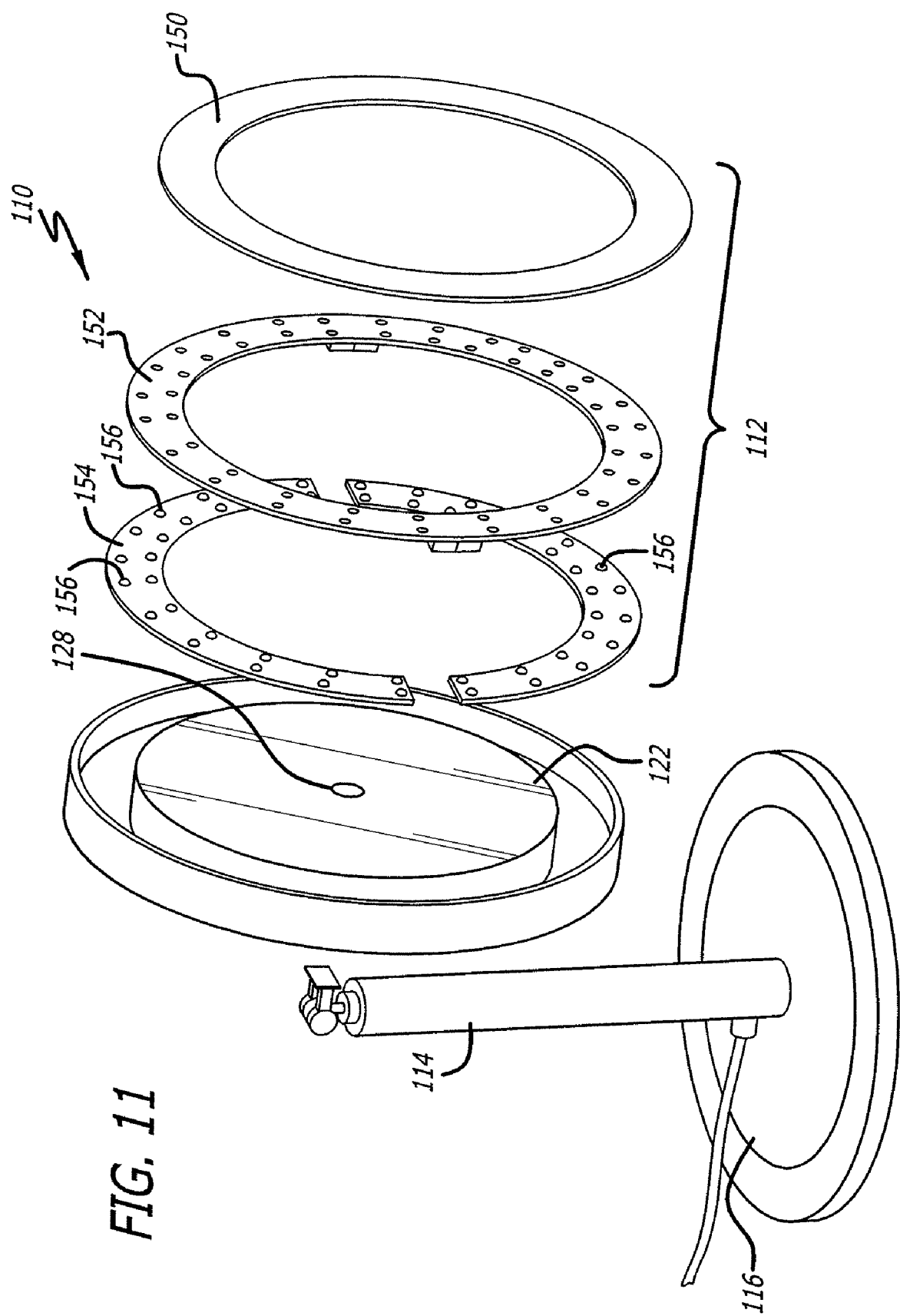
FIG. 11 is an example illustration of various components of the lighting system incorporated into one embodiment of the video camera mirror system.

Referring to FIG. 11, in one embodiment, the lighting system 112 is a lighting system that includes multiple components, such as a diffuser 150, a reflector 152 and a light source 154. The diffuser 150 assists in modifying visual perception by softening shadows and reducing contrast, thereby modifying and enhancing the cosmetic effect of the resulting captured image. Optionally, in one embodiment, the diffuser 150 may contain color temperature correction filters, polarizing filters and multiple layers of diffusion materials that vary in intensity. A variety of materials may be used to create the diffuser 150, including, for example, but not limited to, glass, plastics, resins, fiberglass, ceramic or paper or any combination of these materials.

The reflector 152 is a component of the lighting system 112 that may be used to reflect light and increase brightness and contrast. In one embodiment, the reflector 152 assists in boosting the power of the light source 154 and in focusing and shaping the light itself. The reflector 152 may be composed of a variety of materials, such as, but not limited to, mirrored glass, metallic plastics, resins and highly polished metals or any combination of these compounds and materials.

Additionally, the lighting system 112 may also include screens (not shown) and/or filters (not shown) to further manipulate lighting effects. For example, the color of the resulting emitted light may be manipulated by using particular screens and/or filters. In one embodiment, a series of color correction filters corresponding to a range of colors similar to PANTONE® colors 472C, 723C, 1485C, and 1555C may be used to control and warm the light. Those skilled in the art will appreciate that the PANTONE® color reference system is frequently used to specify color by designers and printers. Those skilled in the art will appreciate that other filters of other colors may be used to control the light. For example filters that replicate the effect of GAMPRODUCT, INC® colors 325 (Bastard Amber), 328 (Tan Tone), 360 (Amber Blush), and 380 (Golden Tan) may also be used. Those skilled in the art will appreciate that GAMCOLOR® is a series of commercially available color filters, used to correct motion picture and video lighting. The GAMCOLOR® filters are typically used in the form of flexible polyester gels that are applied directly to lamps in sheet form, or wrapped around fluorescent lamps in tube form. The above listed GAMCOLOR® number references represent color temperatures and hues of the actual light that may be replicated in one embodiment of the video camera mirror system 110. The video mirror system 110 may employ filters and/or lighting to modify the coloring. Optionally, the cosmetic case 210 may capture an image, and then a microprocessor may perform a color adjustment to captured image. Additionally, in another optional embodiment, polarizing filters may also be used to add contrast and shape to the light.

The lighting system 112 also includes a light source 154. In one embodiment, the light source 154 includes a plurality of LEDs 156 positioned in a circular path around the display screen 122. Other examples of light sources may include, but are not limited to incandescent light bulbs, arc lamps, gas discharge lamps, neon lamps, flood lamps, modern photographic flashes, lasers, organic light-emitting diodes (OLEDs), sulfur lamps, and any other known light sources.

The video camera mirror system 110 includes a stand 114 connected to a base 116. The stand 114 is pivotally connected to the back of the video display 122, thereby permitting adjustment of the position of the video display 122. Optionally, in an alternate embodiment, a hinge attaches the stand 114 to the back of the video display 122, thereby allowing for angle adjustment to accommodate a user. Optionally, in an additional embodiment, the stand 114 allows for height adjustment to accommodate a user peering into the video camera mirror system 110. Additionally, the stand 114 may include a wired connection 118. The wired connection 118 may provide power to the video camera mirror system 110. Additionally, the wired connection 118 may provide a communication interface for transferring data. Optionally, in an alternate embodiment, the wired connection 118 may be positioned on the base 116 (not shown). Alternately, in an optional embodiment, the stand 114 may include a wireless transmitter (not shown) for wireless communication. The video display 122 further includes an embedded camera 128. In one embodiment, the embedded camera is positioned in the center of the video display 122. Alternately, in an optional embodiment, the embedded camera 128 may be positioned anywhere within the video display 122.

Figure 10:
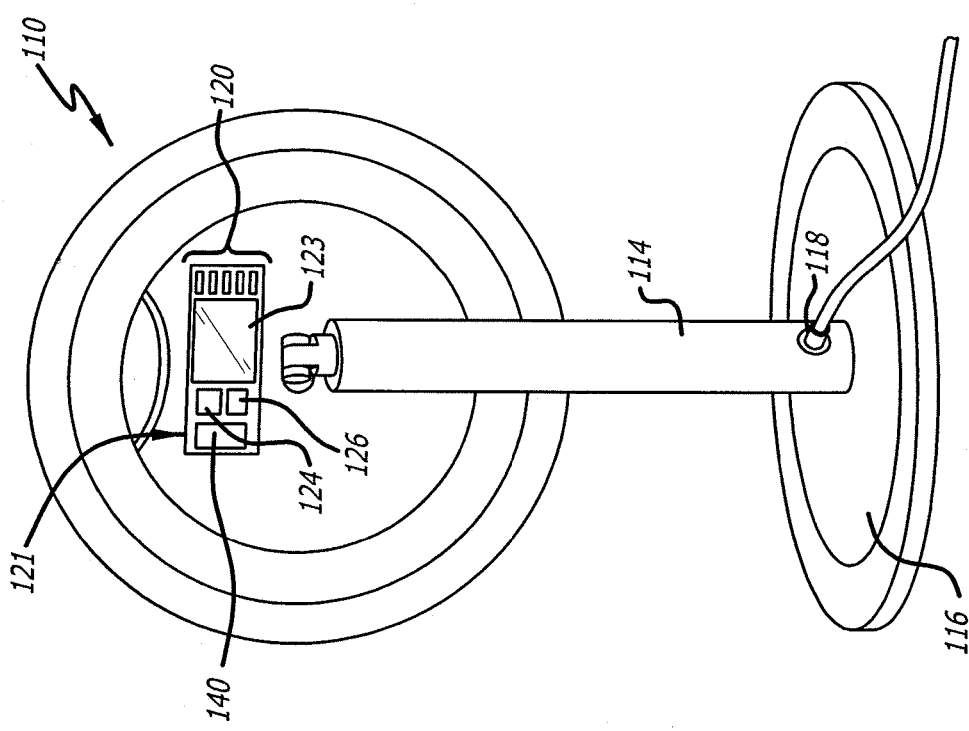
FIG. 10 is the back view of one embodiment of the video camera mirror system.

Referring back to FIG. 10, a control mechanism 121 is positioned on the back side of the video camera mirror system 110. The control mechanism 121 may provide such features as a power switch 140, light temperature controls 120, and a secondary display 123. In one embodiment, the light temperature controls 120 include a button for each of the following settings: a cool light setting, a neutral light setting, and a warm light setting. In an optional embodiment, the light temperature controls 120 also include additional buttons for a sepia setting and a black and white image setting. In FIG. 10, the light temperature controls 120 are in the form of buttons, wherein a user depresses a button to select the desired particular setting. Those skilled in the art will appreciate that the temperature controls may be in the form of dials, sliders, touch screen input, and any other known input mechanism. The control mechanism 121 may include additional input mechanisms for controlling particular functions of the video camera mirror system 110. For example, in one embodiment, the control mechanism 121 includes a button 124 and a button 126 to allow a user to select between a "still mode" and a "movie mode." In one example, if the user selects "still" mode the video camera mirror system 110 captures one or more "still" images (or static images) of a subject. Alternately, if a user selects "movie mode" the video camera mirror system 110 captures moving images of the subject for a particular amount of time.

In one embodiment, the video camera mirror system 110 also records audio. In one example, when the video camera mirror system is in "movie mode," both moving images and audio are captured. In one embodiment, the video camera mirror system 110 includes a microphone system (not shown), wherein a microphone is embedded in the frame that surrounds the display 122. In an optional embodiment, microphones may be placed in the environment around the mirror, for example on or near a chair, on or near a counter, and in headsets to capture the audio in greater detail within a larger scope of area. Additionally, in another embodiment, speakers (not shown) are embedded within the video camera system 110. Optionally, in an alternate embodiment, speakers (not shown) are operatively connected to the video camera mirror system 110. The speakers may be connected via a wire connection, or optionally, via a wireless connection.

In one embodiment, the video camera mirror system 110 includes a second display. More particularly, as illustrated in FIG. 10, a secondary display 123 is positioned on the back of the video camera mirror system 110. The secondary display 123 is depicted as rectangular in shape. However, those skilled in the art will appreciate that the secondary display 123 may be configured as a screen of any shape or size. The secondary display 123 presents real time images captured by the embedded camera 128. In contrast, the video display 122 positioned on the front side of the video camera mirror system 110 presents mirror-images of the captured images (as well as a mirror-image of the image presented on secondary display 123).

The video camera mirror system 110 also includes an automated modification feature. The real time image presented in display 123 is a modified image. Additionally, the real time mirror-image presented in video display 122 is an enhanced mirror-image. In one example, the targeted subject is positioned in front of the video display 122. A user may operate the control mechanism 121 and select a still image mode or a movie mode. For illustrative purposes, in this example the user selects the movie mode. The video camera mirror system 110 then proceeds to capture moving images of the targeted subject. As the video camera captures the images, the captured images are displayed as a reflection of the subject, in real time on the video display 122. Likewise, the captured images are also displayed in real time on the secondary display 123. Additionally, the captured images are presented as modified images. In one embodiment, an automated modification feature automatically modifies the displayed images. The video camera mirror system 110 also captures audio data. Additionally, the captured audio data may be automatically modified, as described above.

In an alternate embodiment, the video camera mirror system 110 includes input mechanisms allowing the user to manipulate the resulting captured image(s). Optionally, the video camera mirror system 110 may work in conjunction with a post production system (not shown) that allows for further modification of the captured images. Additionally, the post production system may allow for further modification, editing and/or enhancement of the recorded audio data. In one embodiment, the post production system includes a software application that aids the user in modifying captured data, including data in the form of still images, moving images and audio date.

The video camera mirror system 110 may record and store the captured images. In one embodiment, the recorded video is transferred to a portable medium. For example, the recorded video may be copied to a disk or other portable memory means. Optionally, the recorded video may be transferred via a network connection to an electronic mail account. Likewise, the recorded video may be transferred and stored to a database. A user may be given the ability to access the database and in particular to access a specific recorded video.

The video camera mirror system 110 may include the ability to transmit and receive data, including images. Optionally, in one embodiment, the data may be transmitted wirelessly. Additionally, the images and/or data may be transmitted and received in real time. Further, the video mirror camera system 110 may also transmit and receive streaming data. Those skilled in the art will appreciate that a processor housed within the camera 10 will control the operation of transmitting, receiving, storing and/or capturing data.

It is important to note that even though the captured images are initially presented on a display 122, the captured images may be viewed later on a different media viewer or display. Additionally, even though FIG. 9 illustrates the display 122 as a circular-shaped display, those skilled in the art will appreciate that the display 122 may be of any shape or size. Further, those skilled in the art will appreciate that the captured images may be viewed later on a media viewer of display of a different shape and size from that of the display 122. More particularly, in one example, a user may view the recorded at a later time on a rectangular-shaped display screen, even though the captured data was initially presented to the user on a circular-shaped display 122.

In one embodiment, the video camera mirror system is used at a cosmetic counter. For example, the cosmetic counter may be located within a department store. A customer may approach the cosmetic counter for a cosmetic demonstration, including the application of cosmetics to his or her face. The video camera mirror system 110 is configured to capture and record the cosmetic demonstration. The images captured and recorded by the video camera mirror system 110 are modified images, as described above. Additionally, the video camera mirror system 110 may record audio as well as visual data.

Once the cosmetic demonstration has finished, the customer may be given a copy of the recorded video on a portable medium, such as a compact disk. Alternately, a copy of the recorded video may be sent to the customer's email address. In an optional embodiment, a copy of the recorded video is stored on a designated website. The customer may create a user account in association with the designated website, and then be permitted to access the recorded video stored on the designated website. Once the customer accesses the recorded video, it may be presented to the customer in a different format and/or shape. For example, the customer may have initially viewed a simulated mirror-reflection of the demonstration in a circular-shaped display at the cosmetic counter. However, once the customer accesses the recorded video at a later date, the recorded images may be presented the customer on a rectangular or square-shaped display.

In an optional embodiment, the demonstration video is made available to a customer on a dedicated website that is password protected. The website includes an easy to use interface that leads the customer to the website's representations of specific products and services that were performed in the demonstration. This allows the customer to review the products that were used, allows the customer quick and easy access to a link to purchase the products online, and provides the customer with a link to send to others, including friends. In one embodiment, the website provides a system that records the customers' preferences and creates customer profiles based on: products demonstrated; customer interviews performed by the demonstrating makeup artist based on an established set of criteria; and by online questionnaire(s) answered by customers themselves.

Additionally, the video camera mirror system 110 may also display other data and imagery in addition to the simulated mirror reflection. For example, the display 122 may present a logo or other pictures on the display screen 122. Additionally, the display 122 may also present pre-recorded video such as, but not limited to, beauty product demonstrations, advertising clips, entertainment, and other imagery designed to captivate and draw the attention of a consumer. Optionally, any type of media may be presented on the display 122.

Figure 12:
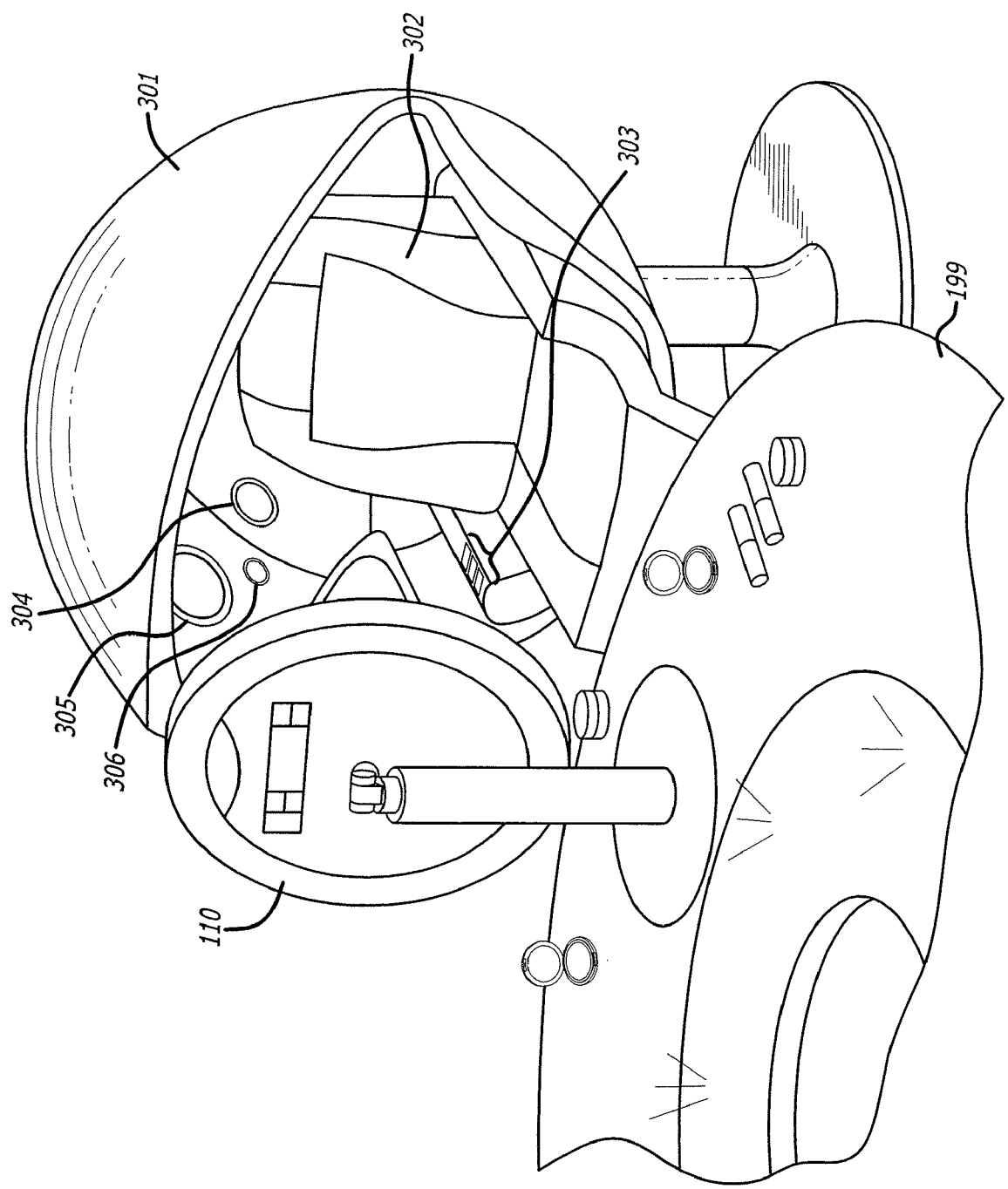
FIG. 12 is another example illustration of a video camera mirror system for use in combination with a chair in accordance with an embodiment of modifying visual perception.

In an alternate embodiment, the cosmetic counter further includes a private compartment, configured to seat a customer in an enclosed and sheltered environment during a cosmetic demonstration. The private compartment provides the capability of controlling and manipulating lighting in the sheltered environment. Referring to FIG. 12, an enclosed chair 301 is illustrated. The enclosed chair 301 is enclosed on the back, sides and roof, thereby providing privacy and, additionally preventing other, competing light sources from lighting a user sitting in the enclosed chair 301. The video camera mirror system 110 is positioned in the appropriate proximate space in front of the chair 301 to capture the cosmetic demonstration of a person sitting in the enclosed chair 301. Additionally, the lighting system 112 of the video camera mirror system 110 acts as a light source for the user sitting in the chair 301.

In one embodiment, the chair 301 includes a seat 302. In an optional embodiment, the seat 302 is composed, at least in part, of memory foam cushion. Additionally, the seat 302 may be insulated to reduce ambient noise. The seat 302 may be designed as an extra wide seat to accommodate all body types. Additionally, the seat 302 may be designed to accommodate multiple bodies. In an alternate embodiment, the seat 302 includes a four-way adjustable leg and foot rest. The seat 302 may also include an adjustable head rest. The height of the seat 302 may also be adjusted. A control panel 303 is located on an arm of the seat 302. The control panel allows for adjustment of the seat height 302 as well as adjustment of the leg and foot rest, and adjustment of the head rest. In an optional embodiment, the chair 301 includes audio speakers 305. The audio speakers 305 may be located on both sides of the seat 302. A control (not shown) may be provided to allow the user to operate the audio speakers 305. Additionally, the audio speakers 305 may be controlled via a remote control device, or via a remote device physically located away from the chair 301. Optionally, in an additional embodiment, the chair 301 may also provide one or more microphones to assist in recording sound.

In an optional embodiment, the chair 301 includes a scent diffuser 306, wherein various scents may be used for olfactory stimulation. The chair 301 may also include a vent 304 to aid in regulating the temperature within the chair. For example, the vent 304 may be an air conditioning vent and/or a heating vent.

In one embodiment, a user (or customer) sits in the chair 301 and a salesperson demonstrates makeup application and techniques. A video camera mirror system 110 is positioned in front of the person sitting in the chair 301 and records the demonstration. Both audio and visual aspects of the demonstration may be recorded. Additionally, the person sitting in the chair 301 may view the demonstration in the "mirror-like" screen of video display 122 during the demonstration. Once the demonstration is over, a copy of the recorded demonstration may be provided to the customer via one of the means previously described above. Additionally, the person sitting in the chair views the demonstration in a round display 122. However, the copy of the demonstration given to the person may be played back in a viewer or media player of different shape and size.

Figure 13:
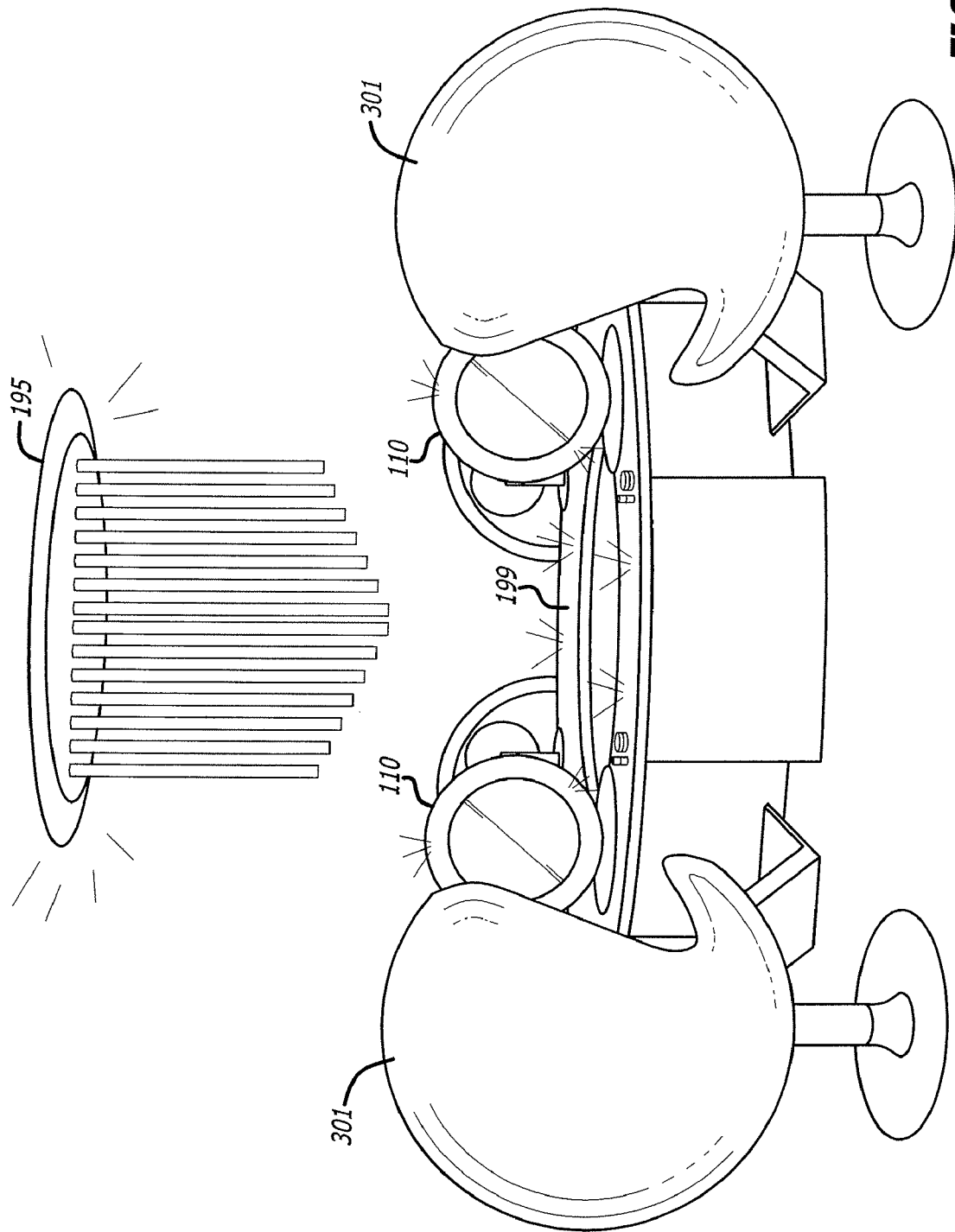
FIG. 13 illustrates an example of another embodiment of a video camera mirror system in combination with a chair in accordance with an embodiment of modifying visual perception.

Multiple chairs 301 may be arranged around a cosmetic counter, or some other central focal point. For example, FIG. 13 illustrates multiple enclosed chairs 301 placed around a counter area 199. A video mirror display 110 is placed on the counter 199 in front of each chair 301. Additionally, in an optional embodiment, a chandelier 195 is positioned over the counter 199 and the chandelier 195 acts as a key light. Additionally, in another optional embodiment, the counter 199 includes an inset countertop light that acts as a fill light.

Figure 14:
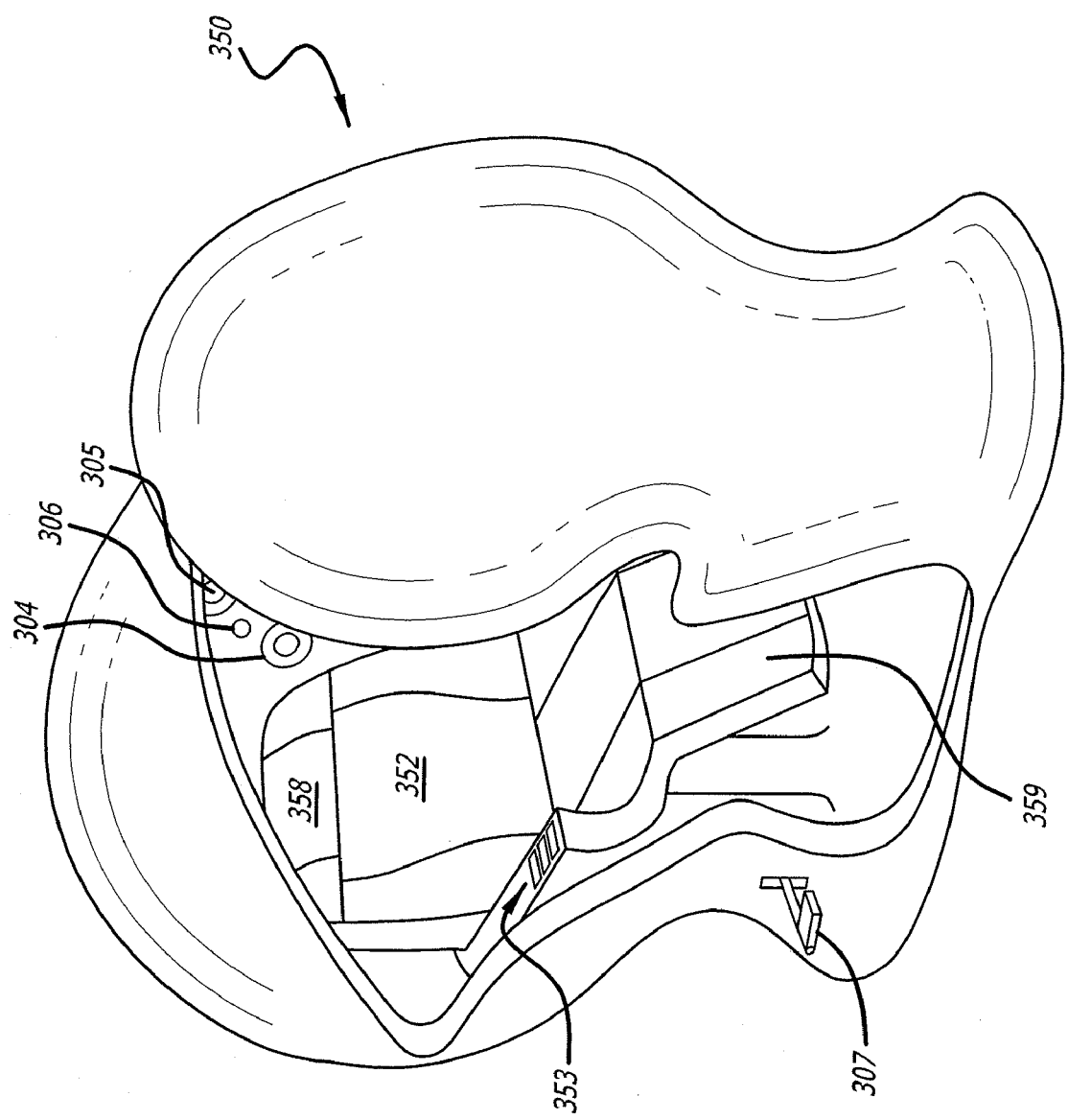
FIG. 14 illustrates a pod for use with another embodiment of modifying visual perception.

In an optional embodiment, the video camera mirror system 110 is used with a pod seating system. In FIG. 14, a pod 350 is shown. The pod 350 includes a seat 352, which may be composed of a memory foam cushion. Additionally, the seat 352 may be insulated to reduce ambient noise. The seat 352 may be designed as an extra wide seat to accommodate all body types, and to accommodate multiple bodies at one time.

The pod 350 includes a control panel 353. The control panel 353 may be used to adjust the seat 352, the head rest 358, and the foot rest 359. Additionally, a control mechanism 307 may be used to adjust the height of the seat 352.

The pod 350 may also include audio speakers 305, which may be placed on each side of the seat 352. Optionally, the pod 350 may also provide one or more microphones (not shown) to assist in recording sound.

The pod 350 may include a scent diffuser 306, wherein various scents may be used for olfactory stimulation. The pod 350 may also include a vent 304 to aid in regulating the temperature within the area of the pod 350. For example, the vent 304 may be an air conditioning vent and/or a heating vent.

Figure 15:
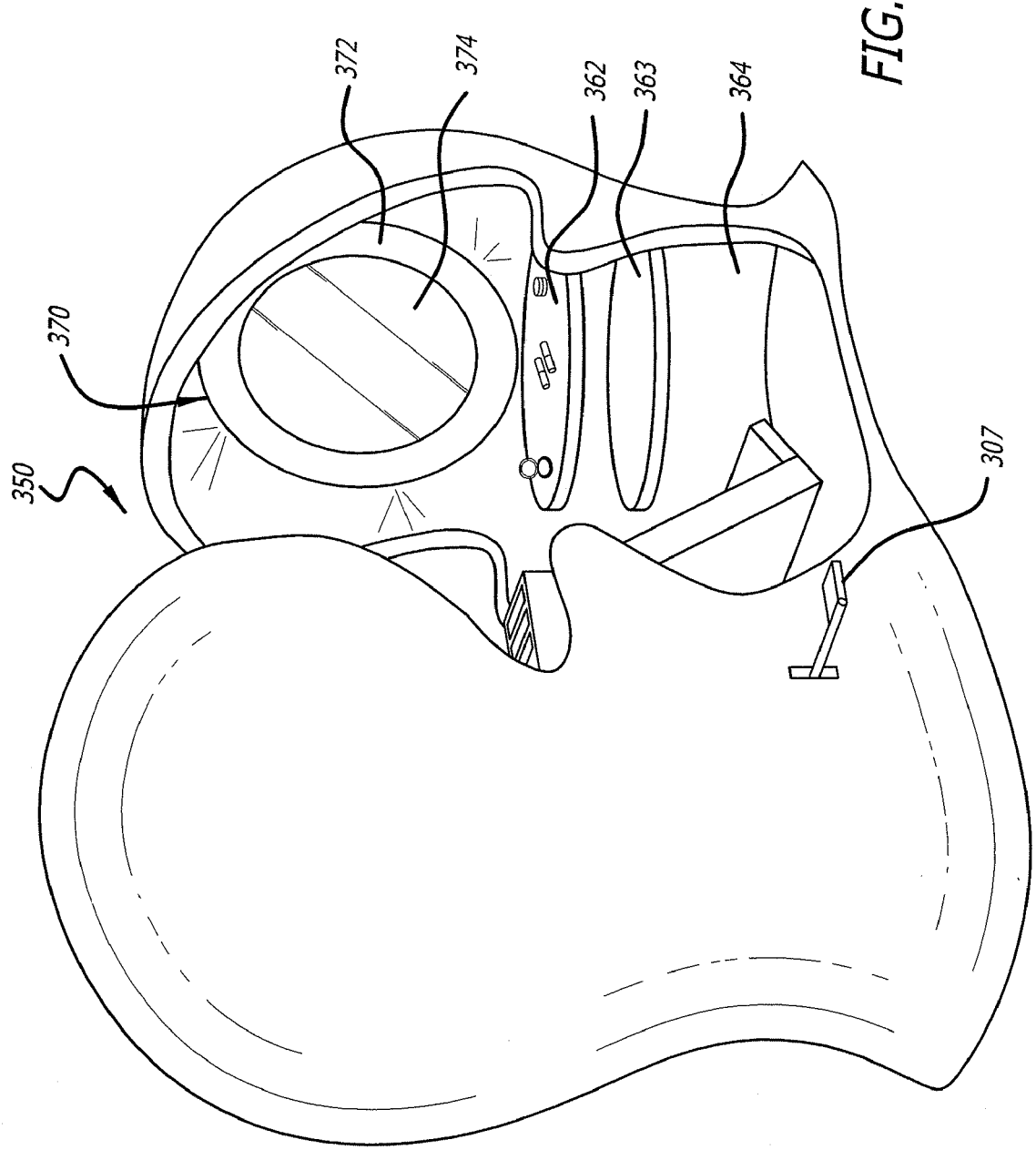
FIG. 15 illustrates an alternate view of the pod.

FIG. 15 illustrates an alternate view of the pod 350. More particularly, a video camera mirror system 370 is positioned in the pod 350 opposite the seat 352. The video mirror 370 includes a lighting system 372 surrounding a video display 374. A camera (not shown) may be positioned or embedded behind the video display 374. The video camera mirror system 370 functions similarly to the video camera mirror system 110 previously disclosed. More particularly, the video display 374 mimics a mirror and provides a simulated reflection of the targeted subject. For example, when a user is positioned in front of the video mirror 370, the embedded camera captures the user's image as video and presents the captured video images on the display screen 374, thus simulating a mirror's reflection.

The pod 350 further includes a product display shelf 362 and customer storage areas 363 and 364.

In one embodiment, the pod 350 may be used to facilitate cosmetic demonstrations. In an alternate embodiment, the pod 350 acts as a telecommunication port. More particularly, the video camera mirror system 110 may send and receive multiple types of data, including, but not limited to, visual data and audio data. The video camera mirror system 110 is connected to a communications network to facilitate the transfer of data. Additionally, in one embodiment, the video camera mirror system 110 is connected to a telecommunications network, thereby permitting and enabling the transmission of data to and from various communication portals. In one embodiment, the video camera mirror system 110 is used as a communication portal. For example, a user can position herself or himself in front of the video camera mirror system 100. The embedded camera 128 captures images of the user (moving and/or still images). The captured images (in the form of data) are transported to a recipient communication device (not shown) and displayed on a recipient device to a recipient located elsewhere. Additionally, the video camera mirror system 110 also captures and records audio date, and likewise facilitates the transmission of the audio data along with the visual data.

In the pod 350, the display 122 may present multiple display windows. For example, the display 122 may include a first window to present the mirror image of the user. Additionally, the display 122 may also include a second window to present the image of another person (located elsewhere) with whom the user is communicating. In an optional embodiment, the pod user may communicate with multiple people at the same time. In one example, the images of all recipients may be presented in separate windows on the display 122. Additionally, the pod 350 may be configured to comfortably hold more than one person.

Further, in another optional embodiment, the pod 350 may comprise one or more lighting elements (not shown) within the pod. The lighting elements may be controlled to manipulate the visual perception of a person sitting in the pod 350. Additionally, the lighting may be controlled to manipulate the effect of illuminated light on the person sitting in the pod 350. Various filters and lighting techniques may be employed to achieve various lighting results. For example, the following GAMCOLOR® numbers refer to commercially available colors and hues in range of golden and peach tones that may be used to create a golden visual appearance in the pod: 325 (Bastard Amber), 328 (Tan Tone), 360 (Amber Blush), and 380 (Golden Tan). Those skilled in the art will appreciate the above list is intended as merely illustrative and is not intended as a limiting list. Further, additional examples of golden and peach hues may be demonstrated by Pantone® colors 472C, 723C, 1485C, and 1555C. Those skilled in the art will appreciate that the above example color references may be achieved via application through a light source or via processing of a captured image data through a digital filtration system.

Figure 16:
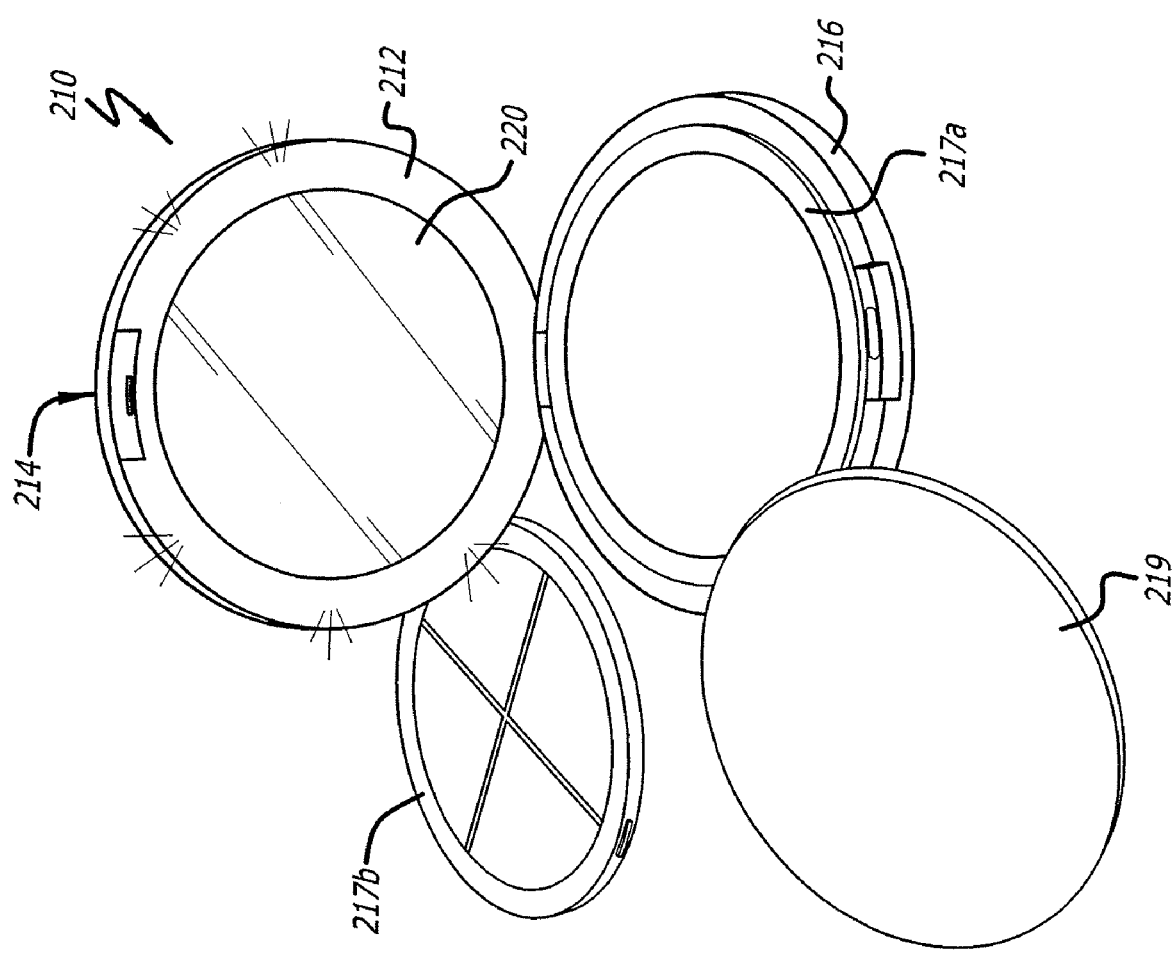
FIG. 16 is an example illustration of one embodiment of a cosmetic compact in accordance with an embodiment of modifying visual perception.
Figure 17:
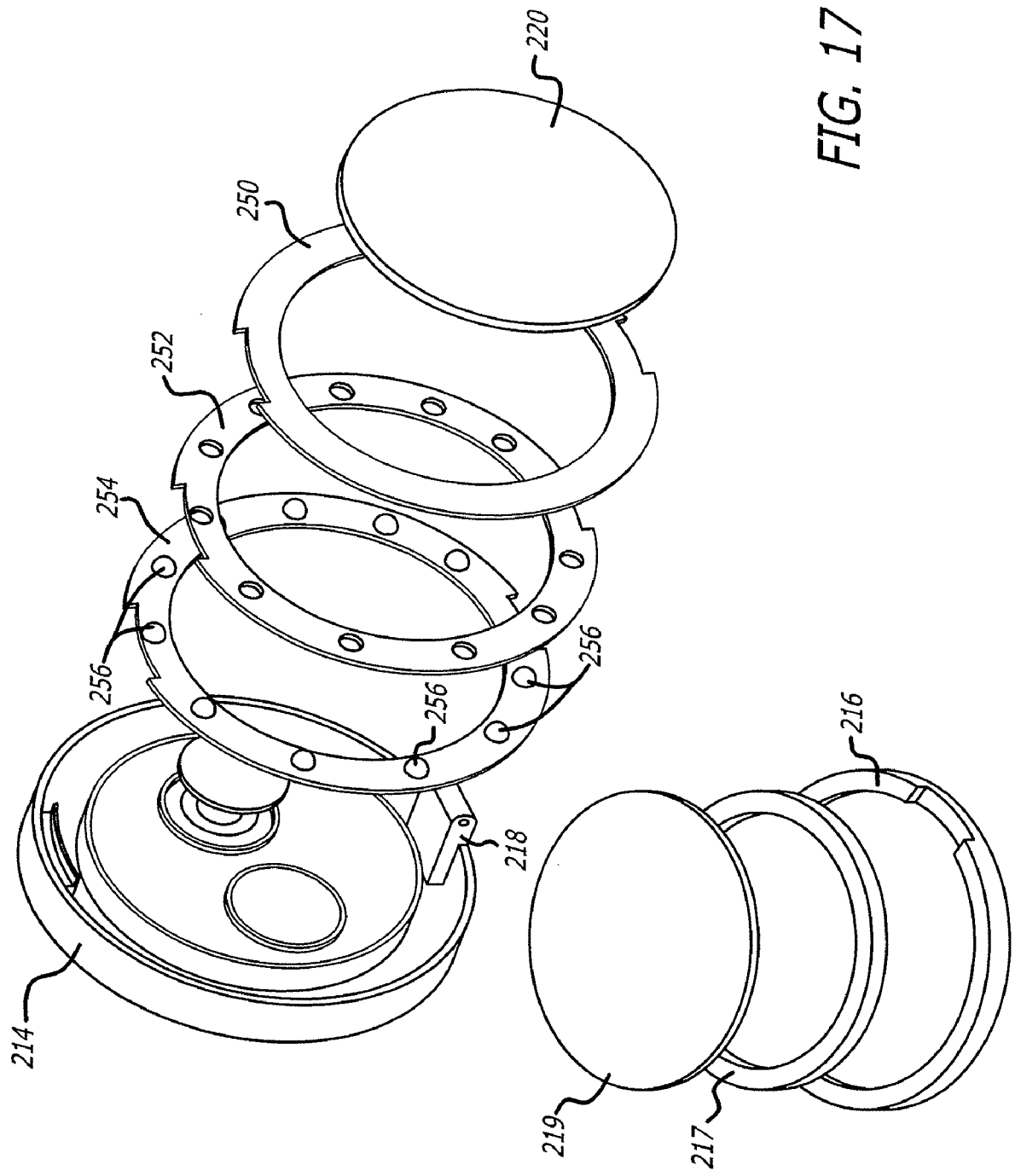
FIG. 17 is an expanded view of one embodiment of a cosmetic compact in accordance with an embodiment of modifying visual perception.

In another embodiment, the system and method for modifying visual perception is applied to a cosmetic case. Referring to FIG. 16, a cosmetic case 210 having a lighting system 212 is shown. In one embodiment, the cosmetic case 210 has a round shape (as shown in FIG. 16). However, those skilled in the art will appreciate that any style or shape of cosmetic case may be designed and used. The cosmetic case 210 includes a top cover 214 pivotally attached to a bottom cover 216. In one embodiment, the top cover 214 is attached to the bottom cover 216 via a hinge 218 (see FIG. 17). Those skilled in the art will appreciate that other mechanisms may be used to moveably attach the top cover 214 to the bottom cover 216.

As shown in FIG. 16, the top cover 214 includes a mirror 220. In one embodiment, the mirror 220 is round. However, the mirror 220 may be configured and designed to be of any shape, size and style. The mirror 220 may include a video camera mirror system as described above. Alternately, the mirror 220 may include a traditional type mirror without the video capability.

The lighting system 212 provides both key and fill light. The lighting system 212 shown in FIG. 16 is illustrated as a circular-shaped light that surrounds the mirror 220. However, those skilled in the art will appreciate that the light source may be of any shape, size and style. For example, in one embodiment, the light source may be a square-shaped light source (not shown) that surrounds the mirror 220. Additionally, in an optional embodiment (not shown), the light source may be a multi-component lighting system. For example, the lighting system could include a first light source positioned above the mirror 220 (acting as the key light) and a second light source positioned below the mirror 220 (acting as the fill light). Further, in one embodiment, the lighting system 212 is a constant light source. Optionally, in an alternate embodiment, the lighting system 212 is a flash light source. Alternately, in an optional embodiment, the lighting system 212 is configured to act as either a constant light source or a flash light source.

The bottom cover 216 includes an interchangeable pan 217a. The interchangeable pan may contain cosmetic contents, such as powder, blush, foundation, eye makeup, etc. Additionally, the interchangeable pan 217a is configured to be removable from the bottom cover 216 and may be replaced with a replacement pan 217b. Further, the interchangeable pan may further hold or contain an application sponge 219. Optionally, the interchangeable pan may also hold a powder puff or other application tool.

In one embodiment, the light settings on the lighting system 212 are adjustable. For example, the brightness or intensity level of the light may be adjusted. Further, the actual color of the light may be adjusted. Optionally, the color of the light may be pre-selected.

In an optional embodiment, the lighting system 212 includes multiple components. For example, the lighting system 212 may comprise a diffuser 250, a reflector 252 and a light source 254. The diffuser 250 assists in modifying visual perception by softening shadows and reducing contrast, thereby modifying and enhancing the cosmetic effect of the resulting captured image. Optionally, in one embodiment, the diffuser 250 may contain color temperature correction filters, polarizing filters and multiple layers of diffusion materials that vary in intensity. A variety of materials may be used to create the diffuser 250, including, for example, but not limited to, glass, plastics, resins, fiberglass, ceramic or paper or any combination of these materials.

The reflector 252 may be used to reflect light and increase brightness and contrast. Additionally, the reflector 252 may be effective in boosting the power of the light source 254 and in focusing and shaping the light itself. The reflector 252 may be composed of a variety of materials, such as, but not limited to, mirrored glass, metallic plastics, resins and highly polished metals or any combination of these compounds and materials.

The light source 254 includes a plurality of LEDs 256 positioned in a circular path. Other examples of light sources may include, but are not limited to incandescent light bulbs, arc lamps, gas discharge lamps, neon lamps, flood lamps, modern photographic flashes, lasers, organic light-emitting diodes (OLEDs), sulfur lamps, and any other known light sources.

In one optional embodiment, the lighting system 212 may also include screens (not shown) and/or filters (not shown) to further manipulate lighting effects. For example, the color of the resulting emitted light may be manipulated by using particular screens and/or filters. In one embodiment, a series of color correction filters corresponding to a range of colors similar to PANTONE® colors 472C, 723C, 1485C, and 1555C may be used to control and warm the light. Those skilled in the art will appreciate that the PANTONE® color reference system is frequently used to specify color by designers and printers. Those skilled in the art will appreciate that other filters of other colors may be used to control the light. For example filters that replicate the effect of GAM-PRODUCT, INC® colors 325 (Bastard Amber), 328 (Tan Tone), 360 (Amber Blush), and 380 (Golden Tan) may also be used. Those skilled in the art will appreciate that GAM-COLOR® is a series of commercially available color filters, used to correct motion picture and video lighting. The GAM-COLOR® filters are typically used in the form of flexible polyester gels that are applied directly to lamps in sheet form, or wrapped around fluorescent lamps in tube form. The above listed GAMCOLOR® number references represent color temperatures and hues of the actual light that may be replicated in one embodiment of the cosmetic case 210. The cosmetic case 210 may employ filters and/or lighting to modify the coloring. Optionally, the cosmetic case 210 may capture an image, and then a microprocessor may perform a color adjustment to captured image. Additionally, in another optional embodiment, polarizing filters may also be used to add contrast and shape to the light.

The cosmetic case 210 may further include a power source 224. In one embodiment the power source 224 is a lithium ion battery. Those skilled in the art will appreciate that alternate power sources may be used. Additionally, the power source 224 may be a replaceable power source. Optionally, in an alternate embodiment, the power source is not replaceable.

In one embodiment, the mirror 220 of the cosmetic case 210 incorporates a video camera mirror system, conceptually similar to the above described video camera mirror system 110. In one embodiment, the display 220 is actually a video display that mimics a mirror and provides a simulated reflection of captured images (similar to the video display 122 described above). For example, when a user positions herself or himself in front of the mirror display 220, an embedded camera (not shown) captures the user's image as video and presents the captured video images on the mirror display 220, thus simulating a mirror's reflection. Additionally, the cosmetic case 210 includes an automated modification feature (not shown). The processing means (not shown) is operatively connected to the cosmetic case 210 and automatically modifies the captured video images in real time and presents the modified video to the user on the mirror display 220. The presented image may be modified and adjusted in a similar fashion as described in the video camera mirror system 110 embodiments.

For example, the automatic modification process may include one or more of the following: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing the image, and elongating the image.

Additionally, in another embodiment, the automated modification feature includes a microprocessor (not shown). The microprocessor analyzes the received images, and facilitates the processes for modification, including automatically adjusting the images as needed, in real time.

In an alternate embodiment, the cosmetic case 210 includes an audio system and is configured to capture and record audio data. Additionally, the cosmetic case 210 is also configured to play back audio data to the user. In an optional embodiment, the captured audio data may be automatically modified. More particularly, the cosmetic case 210 may include an automatic audio modification feature that includes an equalizer, audio leveler and filter that are configured to automatically modify captured audio data, similar to the embodiments described in the camera 110 embodiments above.

In another optional embodiment, the cosmetic case 210 includes a communication mechanism for transmitting and receiving data. In one embodiment, the cosmetic case 210 includes a wireless transmitter that permits the cosmetic case to send and receive data wirelessly. Optionally, the cosmetic case 210 may receive media data, which is then presented to the user on the mirror display 220. For example, the cosmetic case 210 may receive advertising and marketing data that is pertinent to a particular user. The cosmetic case 210 may present the received media on the mirror display 220 for the user to view.

Additionally, in another embodiment, the cosmetic case 210 may transmit and receive streaming data. Additionally, the cosmetic case 210 may transmit and receive data wirelessly. Optionally, the data may be transmitted and received in real time.

In another embodiment, the system and method for modifying visual perception is applied to a cosmetic packaging. Referring to FIG. 18, a cosmetic package 250 having a lighting system 252 is shown. The lighting system 252 provides both key and fill light. The lighting system, as shown in FIG. 18, is illustrated as a circular-shaped light that surrounds the mirror 260. However, those skilled in the art will appreciate that the light source may be of shape, size, and/or style. Additionally, in an optional embodiment (not shown), the light source may be a multi-component lighting system. For example, the lighting system could include a first light source positioned above the 260 (acting as the key light) and a second light source positioned below the mirror 260 (acting as the fill light). Further, in one embodiment, the lighting system 252 is a constant light source. Optionally, in an alternate embodiment, the lighting system 252 is a flash light source. Alternately, in an optional embodiment, the lighting system 252 is configured to act as either a constant light source or a flash light source. In one embodiment, the lighting system 252 is composed of multiple LED light sources (not shown), positioned in a circular path around the mirror 260.

The mirror 260 may include a video camera mirror system as described above. Alternately, the mirror 260 may include a traditional type mirror without the video capability. The cosmetic package 250 includes a top cover 254 pivotally attached to a bottom 256. In one embodiment, the top cover 214 is attached to the bottom 216 via a pivot point (not shown). Those skilled in the art will appreciate that other mechanisms may be used to moveably attach the top cover 254 to the bottom 256. Additionally, the bottom 256 may hold an interchangeable cosmetic pan 217. The interchangeable pan 217 may hold various kinds of cosmetics, as well as makeup applicators.

In one embodiment, the mirror 260 of the cosmetic package 250 incorporates a video camera mirror system, conceptually similar to the above described video camera mirror system 110. In one embodiment, the mirror display 260 is actually a video display that mimics a mirror and provides a simulated reflection of captured images (similar to the video display 122 described above). For example, when a user positions herself or himself in front of the mirror display 260, an embedded camera (not shown) captures the user's image as video and presents the captured video images on the mirror display 260, thus simulating a mirror's reflection. Additionally, the cosmetic package 250 includes an automated modification feature (not shown). The processing means (not shown) is operatively connected to the cosmetic package 250 and automatically modifies the captured video images in real time and presents the modified video to the user on the mirror display 260. The presented image may be modified and adjusted in a similar fashion as described in the video camera mirror system 110 embodiments.

For example, the automatic modification process may include one or more of the following: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing the image, and elongating the image.

Additionally, in another embodiment, the automated modification feature includes a microprocessor (not shown). The microprocessor analyzes the received images, and facilitates the processes for modification, including automatically adjusting the images as needed, in real time.

In another embodiment, the cosmetic packaging is directed to packaging lipstick. More particularly, FIG. 21 illustrates one embodiment of a lipstick packaging 410. The lipstick packaging includes a top tube end 414 (also called the cap) and a bottom tube end 416 (also called the container). A first lighting system 412a is positioned along a ridge of the bottom tube end 416. Additionally, a mirror 420 is positioned on the outer top side of the top tube end 414. The lipstick packaging 410 contains a tube of lipstick 411.

Figure 22:
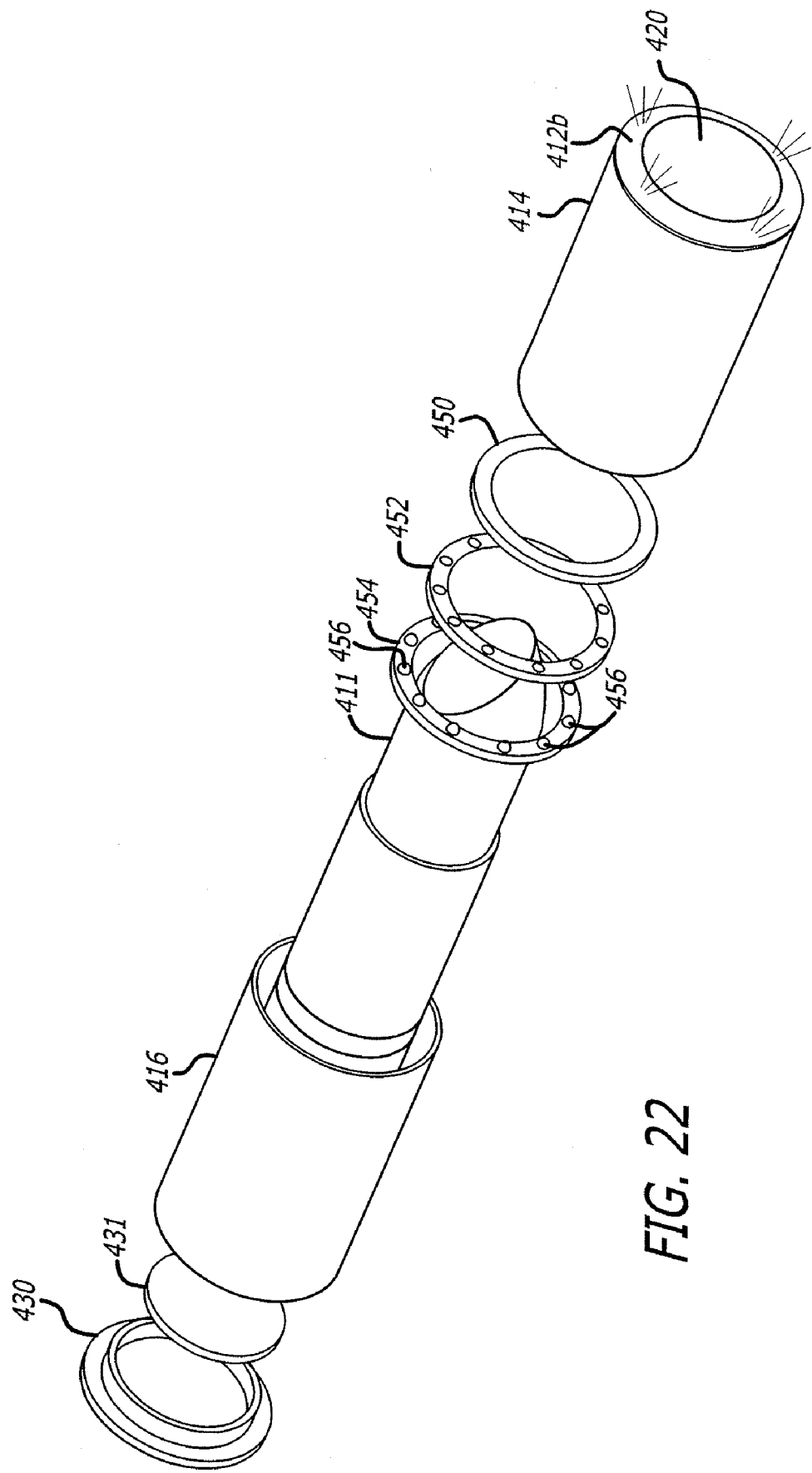
FIG. 22 is an expanded view of the lipstick packaging.

In an optional embodiment, the first lighting system 412a is a lighting system that includes multiple components. Referring to FIG. 22, the first lighting system 412a comprises a diffuser 450, a reflector 452 and a light source 454. The diffuser 450 assists in modifying visual perception by softening shadows and reducing contrast. Optionally, in one embodiment, the diffuser 450 may contain color temperature correction filters, polarizing filters and multiple layers of diffusion materials that vary in intensity. A variety of materials may be used to create the diffuser 450, including, for example, but not limited to, glass, plastics, resins, fiberglass, ceramic or paper or any combination of these materials.

The reflector 452 may be used to reflect light and increase brightness and contrast. Additionally, the reflector 452 may effectively boost the power of the light source 454 and assist in focusing and shaping the light itself. The reflector 452 may be composed of a variety of materials, such as, but not limited to, mirrored glass, metallic plastics, resins and highly polished metals or any combination of these compounds and materials.

In one embodiment, the light source 454 includes a plurality of LEDs 456 positioned in a circular path. Other examples of light sources may include, but are not limited to incandescent light bulbs, arc lamps, gas discharge lamps, neon lamps, flood lamps, modern photographic flashes, lasers, organic light-emitting diodes (OLEDs), sulfur lamps, and any other known light sources.

In one embodiment, the intensity, contrast and/or color of the first lighting system 412 may be controlled. In one embodiment, the first lighting system 412 is configured to emit a neutral colored light. Optionally, in another embodiment, the first lighting system 412 is configured to emit a golden light. Alternately, in another embodiment, the first lighting system 412 is configured to emit a peach-golden light.

In an optional embodiment, the lipstick packaging 410 further comprises a second lighting system 412b positioned around the mirror 420 on the top tube end 414. The second lighting system may include multiple components, similar to the first lighting system 412a, such as a diffuser (not shown), a reflector (not shown), and a light source (not shown). In an alternate embodiment, the lipstick packaging 410 comprises only the second lighting system 412b positioned around the mirror 420 and does not include the first lighting system 412a positioned along the ridge of the bottom tube end 416.

A power source 431 provides power to operate the lighting systems 412a, 412b, or a combination thereof. In one embodiment, the power source 431 is a battery that is inserted within the bottom tube portion 416, and secured by a cover 430. Those skilled in the art will appreciate that other power sources may be used.

In another embodiment, the system and method for modifying visual perception is applied to cosmetic tools. For example, referring to FIG. 23 and FIG. 24 an illuminated cosmetic brush 510 is shown. The illuminated cosmetic brush 510 includes a built-in light source 512. In one embodiment, the light source 512 is a lighting system that is positioned on the brush handle 518 so that the light is directed towards the brush head 514. Optionally, the lighting system 512 encircles the handle 518 to create an illuminating, lighting effect that surrounds the entire brush head 514. The lighting system 512 is a constant light source that provides both key and fill light. In one embodiment, the light source 512 includes a plurality of LEDs positioned in a circular path beneath a screen or filter. Other examples of light sources may include, but are not limited to incandescent light bulbs, arc lamps, gas discharge lamps, neon lamps, flood lamps, lasers, organic light-emitting diodes (OLEDs), sulfur lamps, and any other known light sources.

In one embodiment, the intensity, contrast and/or color of the light source 512 may be controlled. In one embodiment, the light source 512 is configured to emit a neutral colored light. Optionally, in another embodiment, the light source 512 is configured to emit a golden light. Alternately, in another embodiment, the light source 512 is configured to emit a peach-golden light.

The brush head 514 may be removed from the handle 518. A male and female fastener system 520 and 521 secure the brush head 514 to the handle 518. A power button 516 positioned on the handle 518 operates the built-in light source 512.

In an optional embodiment, various brush heads may be used to replace the first brush head 514. Additionally, brush heads of various sizes, lengths and fills may be used with the handle 518.

In another embodiment, the system and method for modifying visual perception employs lighting techniques, including the placement and positioning of lighting in a particular location. More particularly, one embodiment provides the proper placement of key light and fill light in a location, such as a room in a building or home. Various techniques may be utilized to enhance the effect of the placed lighting. For example, cosmetics, coloring systems, material compositions, furniture placement, architectural design and natural light control may be used to achieve a modified visual perception. Additionally, filters and lighting techniques may be utilized so that the resulting illuminating light produces the perception of a visually enhancing appearance. Further, in one embodiment the lighting in a particular environment is managed and controlled so that the resulting lighting appears to enhance the subjects in the environment.

Figure 25:
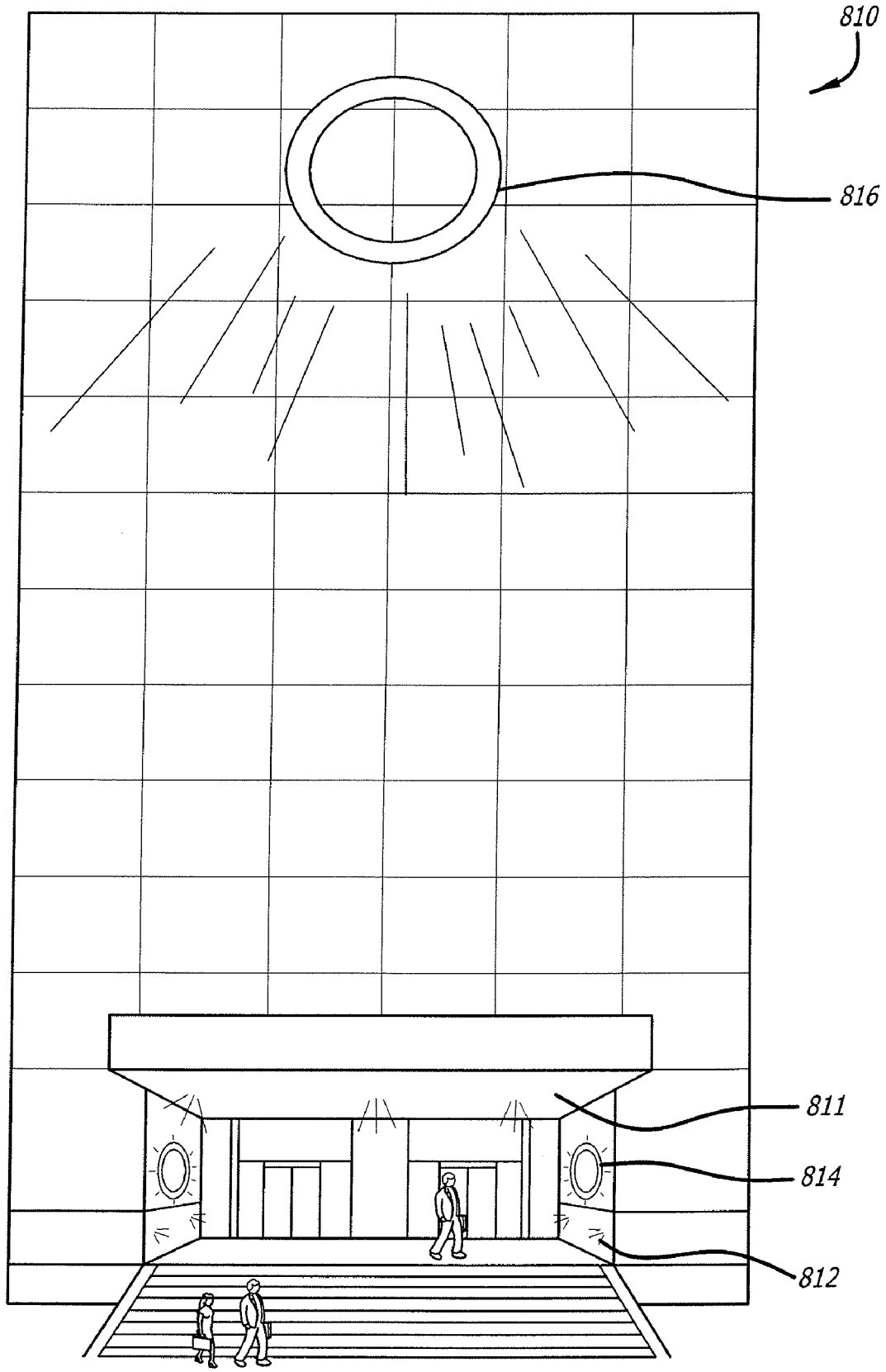
FIG. 25 is an example illustration of an exterior lighting system in accordance with an embodiment of modifying visual perception.

In one embodiment, the system and method for modifying visual perception is utilized to visually modify the perception of an entrance into a building. In FIG. 25 multiple light sources are strategically positioned to create a modified visual effect. Those skilled in the art will appreciate that a variety of types of lights sources may be employed to modify visual perception. Examples of light sources include, but are not limited to, LEDs, incandescent light bulbs, arc lamps, gas discharge lamps, neon lamps, flood lamps, lasers, organic light-emitting diodes (OLEDs), sulfur lamps, and any other known light sources.

In FIG. 25, an entrance canopy light box 811 acts as a key light and provides light for subjects walking into the building. Additionally, illuminated architectural panels 812 provide fill light for the same subjects. Further the combined key and fill lights (e.g. the canopy light box 811 and the architectural panels 812) may affect the perceived appearance of subjects, including humans, in the building entrance. Additionally, the light emanating from the light sources (e.g. the canopy light box 811 and architectural panels 812) may be designed and/or configured to produce light of a certain color. Optionally, filters may also be used to manipulate the lighting effect. As previously described above, the lighting may be manipulated to produce an effect of golden and brown tones. Examples of these colors may be demonstrated by the by Pantone® coloring system. Such colors include, but are not limited to Pantone® colors 4655U, 4645U, 154U, and 139U. Additionally, as previously described above, the coloring effects may also be demonstrated by the GAMPRODUCT, INC® colors. Such colors included, but are not limited to GAMCOLOR® numbers: 370 (Spice), 380 (Golden Tan), 430 (Warm Ivory), 390 (Walnut), 364 (Pale Honey), 365 (Warm Straw) and 433 (Double Ivory). Those skilled in the art will appreciate the above list is intended as merely illustrative and is not intended as a limiting list. Optionally, in another embodiment, the lighting is manipulated to produce lighting of different tones, such as but not limited to, greens, blues, browns, peaches, roses, reds, nudes, and any other colors and tones known.

Figure 26:
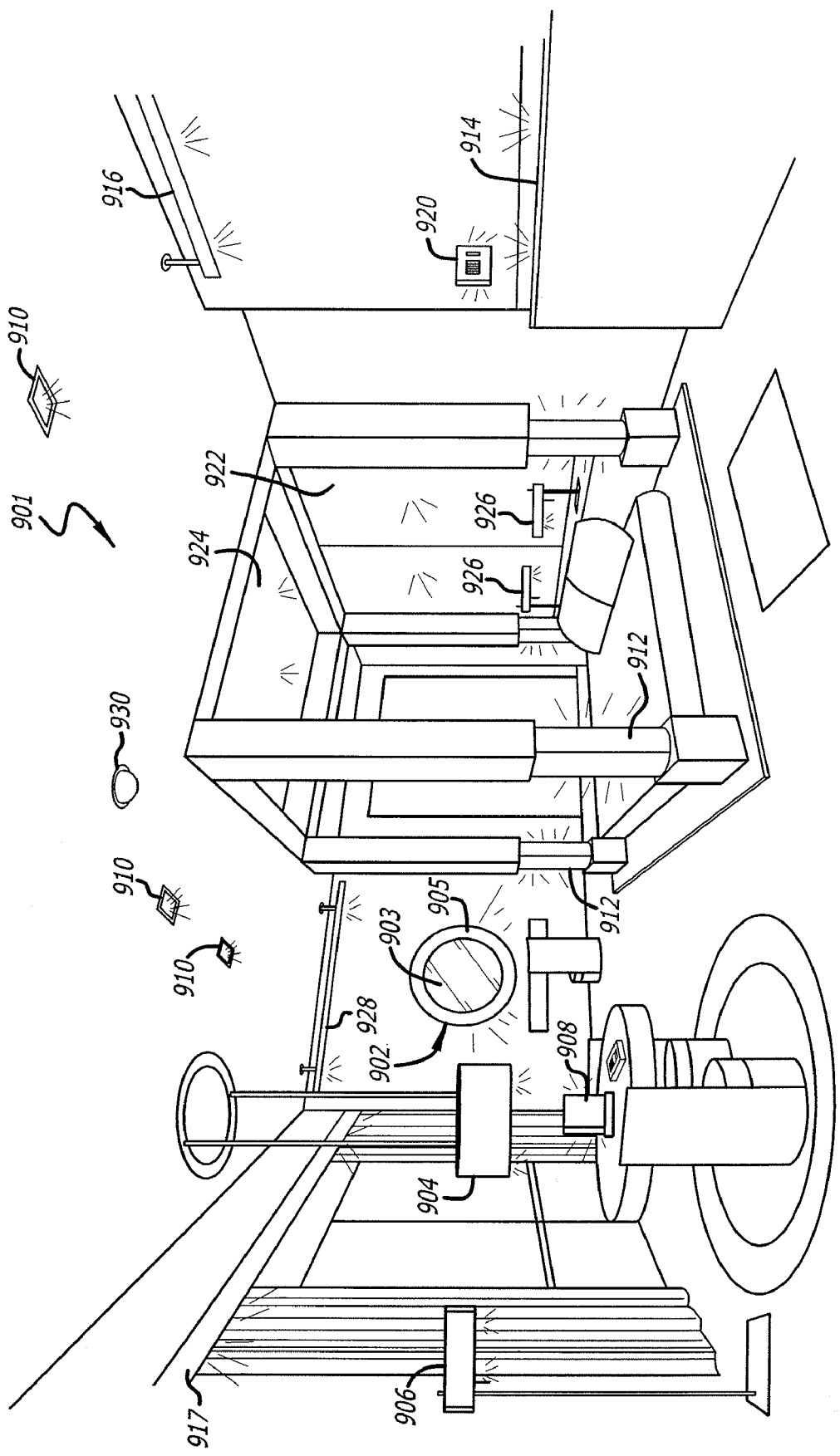
FIG. 26 is another example illustration of an interior lighting system in accordance with an embodiment of modifying visual perception.

In another embodiment, the system and method for modifying visual perception is applied to a room. More particularly, in one embodiment lighting is strategically utilized in an example room 901 as illustrated in FIG. 26. The light can serve multiple functions, depending on the placement of the subjects in the room. The lighting may serve a practical function such as providing light for a person to perform a task (sometimes referred to as task lighting). Additionally, the lighting may be utilized to visually enhance the appearance of subjects in a room. More particularly, key lighting and fill lighting may be provided in a room to create an enhanced cosmetic effect. Further, coloring techniques may be employed to further enhance the cosmetic effect and the visual perception.

In the room illustrated in FIG. 26, a pendant lamp 904 provides light in the room 901, but also serves as key light for people sitting at the table below the pendant lamp 904. Additionally, the centerpiece lamp 908 positioned on the table, beneath the pendant lamp 904, provides fill light for the same subjects sitting at the table. The light emanating from the pendant lamp 904 and/or centerpiece lamp 908 may be designed and/or configured to produce light of a certain color and/or tone. Optionally, filters may also be used to manipulate the lighting effect. As previously described above, the lighting may be manipulated to produce an effect of golden and brown tones. Examples of these colors may be demonstrated by the by Pantone® coloring system. Such colors include, but are not limited to Pantone® colors 4655U, 4645U, 154U, and 139U. Additionally, as previously described above, the coloring effects may also be demonstrated by the GAMPRODUCT, INC® colors. Such colors included, but are not limited to GAMCOLOR® numbers: 370 (Spice), 380 (Golden Tan), 430 (Warm Ivory), 390 (Walnut), 364 (Pale Honey), 365 (Warm Straw) and 433 (Double Ivory). Those skilled in the art will appreciate the above list is intended as merely illustrative and is not intended as a limiting list. Optionally, in another embodiment, the lighting is manipulated to produce lighting of different tones, such as but not limited to, greens, blues, browns, peaches, roses, reds, nudes, and any other colors and tones known.

A column light 912 is used in each of the four posts of the bed shown in room 901. The column lights 912 may serve as fill light in the room 901 when a person is standing near the column light. However, the column light 912 may instead serve as key light when a person is lying on the bed. Additionally, the various light in the room acts as task lighting. For example, the reading lamps 926 can also provide light so that a person may read. Optionally, in one embodiment, an architectural dome with recessed lighting, or dome lighting 924 is positioned over the bed in the room. The dome lighting may act as a key light source. Illuminated wall panels 922 are positioned behind the bed and also provide light. As described above, the color of light emitted from the light sources may be controlled and altered in order to modify visual perception. In one embodiment, the coloring of the emitted light is adjusted so that it produces an enhanced visual perception in the room environment.

The room in FIG. 26 also includes four-way ceiling mount lights 910 that may provide task lighting as well as key lighting. The wall washer light 916 may illuminate a person or subject that is positioned near the wall, thereby acting as a key light. The chair rail light 914 would serve as a fill light for a person positioned near the wall. The wall washer light 916 and chair rail light 914 act in combination to enhance the visual appearance of the person positioned near the wall. In other words, in one example, if a first person is positioned near the wall having the wall washer light 916 and chair rail light 914, and a second person is looking at the first person, then the effect of the light 916 and 914 would visually enhance the second person's perception of the first person.

A mirror 903 is positioned on the wall in the room 901. A lighting system 905 surrounds the mirror 903. Additionally, in one embodiment, the mirror 903 is a video mirror as described above. Further, in one embodiment, the mirror 903 may be used for telecommunications purposes.

Additionally, in an optional embodiment, the room includes a sensor 930. Optionally, the sensor may be connected to a microprocessor (not shown) and/or controller (not shown) that controls the lighting in the room. The sensor 930 can detect a person inside the room. Additionally, in one example embodiment, the sensor is configured to detect and sense particular qualities of skin from a target image (such as from a person). In particular, the sensor may detect skin coloring, skin type or other skin features. The microprocessor and/or control may then use the information to adjust the coloring of the light emitted from the various light sources in the room, so that the emitted enhances the visual perception of others of the targeted person or persons.

Optionally, in another embodiment, the system and method for modifying visual perception may be applied to textiles. For example, in one embodiment, the bedding may be comprised of textiles that have a lighting element. The lighting may be via electronic means, chemical means, a combination thereof, or any other means know. The lighting in the bedding textiles may serve as fill lighting and may better enhance the appearance of an individual. Additionally, the textile lighting may also enhance the others' perception of a person.

Further, in another example embodiment, the system and method for modifying visual perception may be applied to wearable textiles and/or wall coverings. More particularly, lighting effects may be utilized in such items as clothing or other textiles worn by humans. They lighting assists in visually enhancing the perception of the person. Additionally, lighting effects and techniques may also be employed in wall coverings.

Additionally, in another optional embodiment, the system and method for modifying visual perception may be employed in three dimensional imagery, such as, but not limited to holograms.

Figure 27:
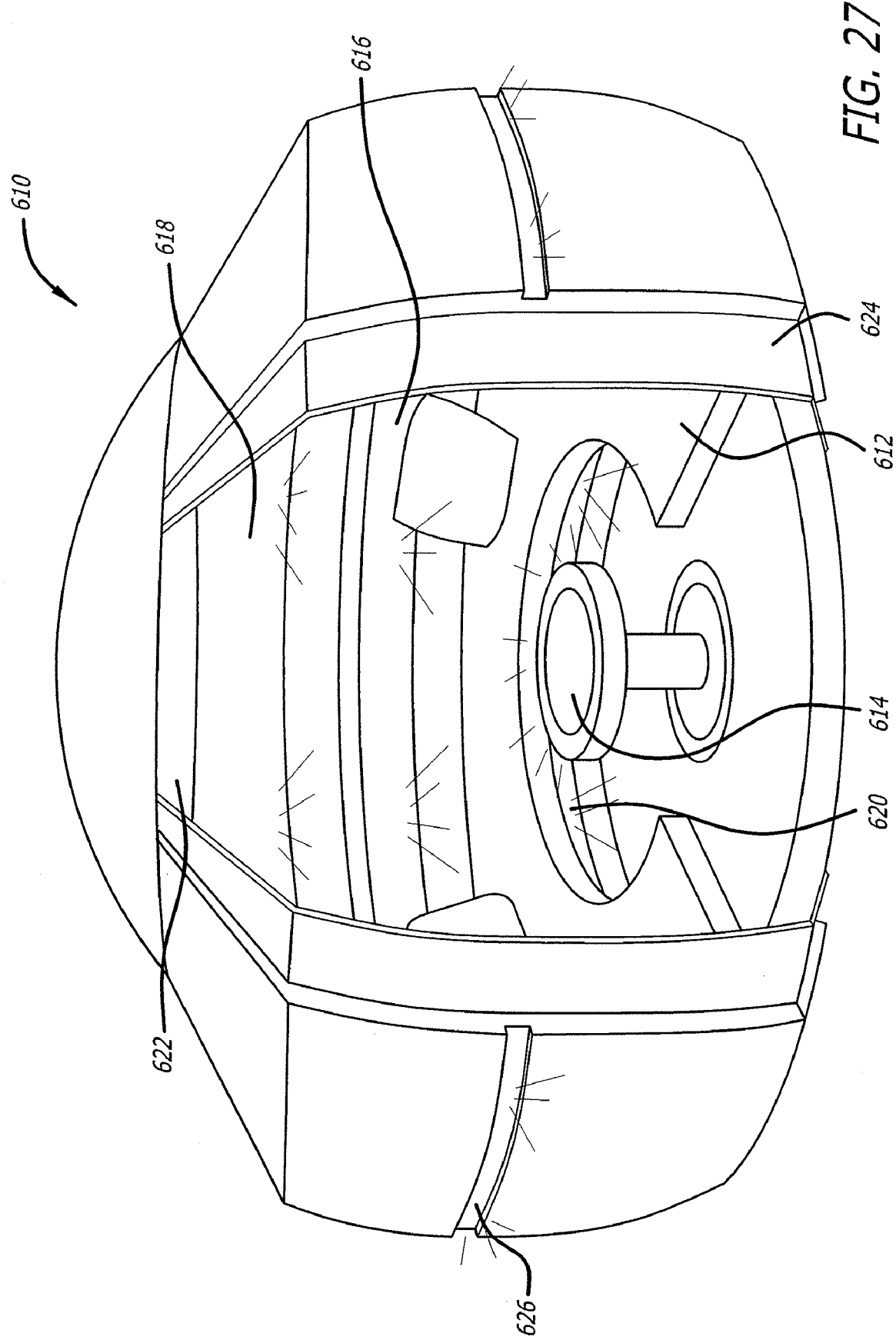
FIG. 27 is an example illustration of an enclosed pod structure in accordance with an embodiment of modifying visual perception.
Figure 31:
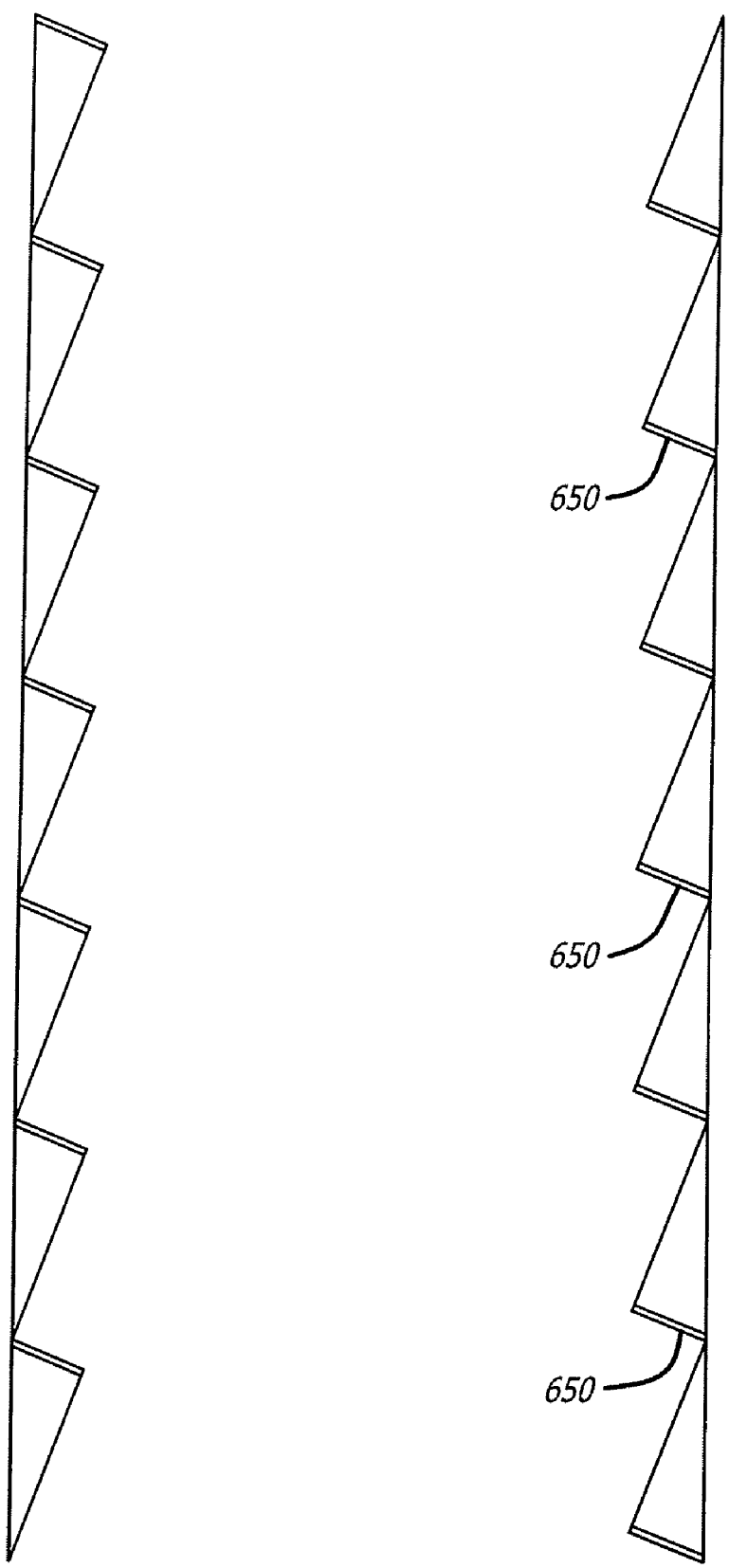
FIG. 31 is an overhead view of the placement of multiple polarized mirrors in accordance with an embodiment of modifying visual perception.

In FIG. 27 a large pod structure 610 is illustrated. Sliding doors 624 close the pod. In one embodiment, the sliding doors 624 are air-lock doors. Lighting is strategically placed within the pod to modify the visual perception inside. For example, hidden floor lighting 620 is placed under the bench seating 612. The floor lighting 620 provides a warm glow in the room. Additionally, the table 614 may be illuminated in some embodiments, and serve as fill light for people sitting on the bench 612. Hidden chair rail fill lighting 616 is strategically positioned inside the pod. Additionally, hidden architectural key lighting 618 is also placed inside the pod. In various embodiments, a LED programmable dome screen display 622 is placed on the inside of the pod dome. Additionally, in one embodiment, after the doors 624 have closed, the inside of the pod 610 is filled with oxygen and other nutrients. More particularly, in some embodiments, the interior of the pod 610 may be over-oxygenated. Additionally, the interior of the pod 610 may be filled with various scents and aromas. As described above various lighting techniques may be employed to modify and/or enhance the visual perception within the pod structure 610.

In another embodiment, the system and method for modifying visual perception includes a polarized mirror. In FIG. 28, a polarized mirror 650 is illustrated. The polarized mirror includes a display 656. Additionally, a key light 652 is positioned over the display 656 and a fill light 654 is positioned under the display 654. The key light shapes and defines the facial features displayed in the mirror 650, while the fill light 654 softens the shadows and creates the illusion of a glow lit from within.

Optionally, in an alternate embodiment, a light source may surround the entire polarized mirror 650 (not shown). A top portion of the surrounding light source would act as the key light and the bottom portion of the surrounding light would act as the fill light. Examples of light sources may include, but are not limited to LEDs, incandescent light bulbs, arc lamps, gas discharge lamps, neon lamps, flood lamps, lasers, organic light-emitting diodes (OLEDs), sulfur lamps, and any other known light sources.

In one embodiment, the key light 652 is covered with a polarization filter. Optionally, in another embodiment, the fill light 654 is covered with a polarization filter. The polarization filter over one or more light sources creates the visual perception of greater contrast and greater color saturation.

FIG. 29 is a cross section cut through the line 29 of FIG. 28 and illustrates the multiple layers of the polarized mirror, wherein reference numeral 681 denotes the mirror front and reference numeral 688 denotes the mirror back. A diffusion material 684 is sandwiched between the glass 682 and mirrored surface 686. Diffusion softens the appearance of skin within the reflection itself. A polarized filter 680 is positioned on the glass surface 682. The polarization of the glass surface 682 in combination with the polarization of the light sources 652 and 654 creates the visual perception of greater contrast and greater color saturation.

Additionally, in an alternate embodiment, the glass is colored. More particularly, in one example, golden-toned colors are added to the glass surface 682 to modify and enhance the appearance of the skin displayed in the mirror. Optionally, in one embodiment, the mirror includes convex distortion on the vertical axis. The slight vertical axis distortion renders a slimmer looking reflection. The reflection in the mirror 650 is a modified reflection. More particularly, in one embodiment, the reflection in the mirror 650 is an enhanced reflection.

Optionally, in another embodiment, multiple polarized mirrors 650 may be strategically placed in an environment to achieve a particular effect. For example, in FIG. 30, multiple polarized mirrors are angularly positioned in a corridor. This strategic placement allows a person to always see the front of his/her reflection, regardless of whether he/she is walking up or down the corridor. As each mirror is a polarized mirror, each reflection is an enhanced reflection. In one example embodiment, the polarized mirrors 650 are each positioned at angles of between approximately 25 degrees to approximately 75 degrees in relation to the corridor wall. Alternately, in another optional embodiment, the polarized mirrors 650 are each positioned at approximately a 45 degree angle in relation to the corridor wall.

In another optional embodiment, a polarized mirror may be used in combination with the cosmetic case 210 illustrated in FIG. 16. More particularly, the mirror 220 may be a polarized mirror, wherein the polarized mirror is composed similarly to the polarized mirror 650 described above and illustrated in FIG. 28 and FIG. 29. For example, the mirror 220 may include a diffusion material sandwiched between glass and a mirrored surface (as illustrated in FIG. 29). Additionally, a polarized mirror 220 may also include a polarized filter layered on the glass surface of the mirror. (similar to the polarized filter illustrated in FIG. 29).

In another embodiment, a polarized mirror may be used in combination with the cosmetic packaging illustrated in FIG. 18. More particularly, the mirror 260 may be a polarized mirror, wherein the polarized mirror 260 is composed similarly to the polarized mirror 650 described above and illustrated in FIG. 28 and FIG. 29.

In another embodiment, a polarized mirror may be used in combination with the lipstick packaging 410 illustrated in FIG. 21. More particularly, the mirror 420 may be a polarized mirror, wherein the polarized mirror 420 is composed similarly to the polarized mirror 650 described above and illustrated in FIG. 28 and FIG. 29.

Figure 33:
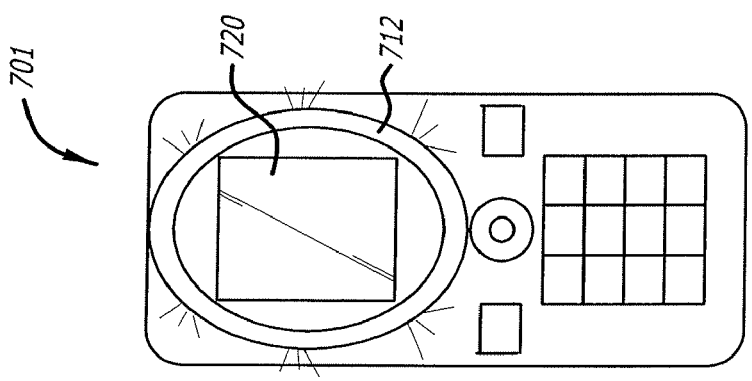
FIG. 33 is another example illustration of a mobile device in accordance with another embodiment of modifying visual perception.
Figure 32:
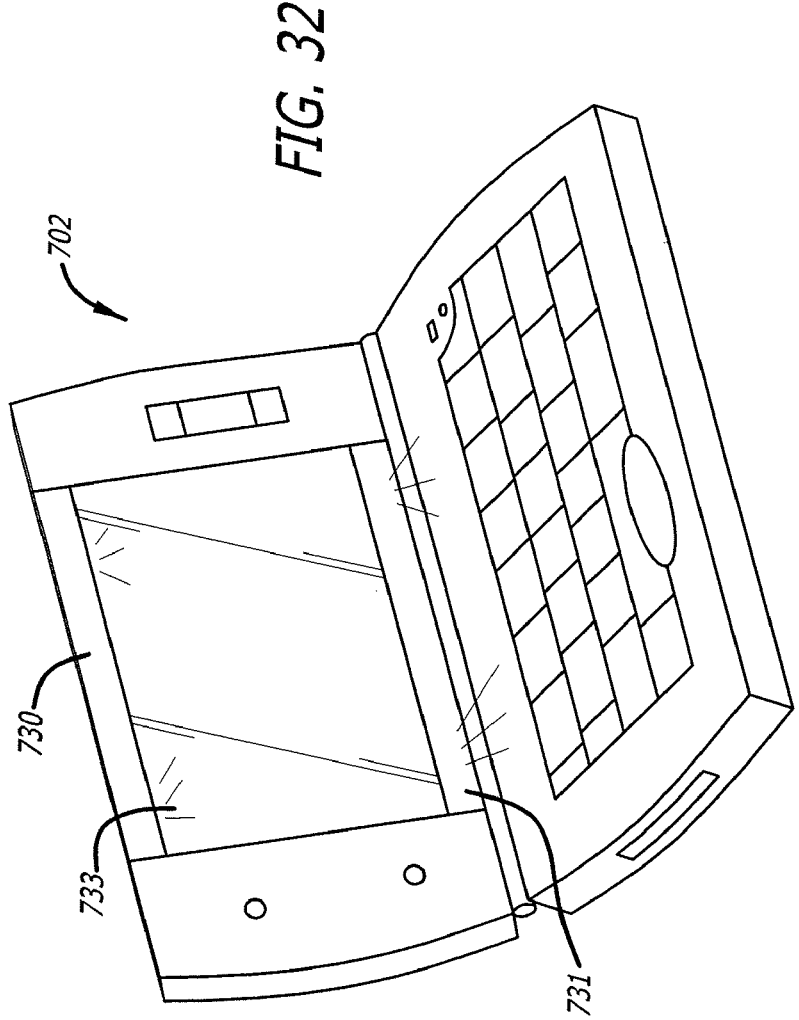
FIG. 32 is an example illustration of a mobile device in accordance with an embodiment of modifying visual perception.

In another embodiment, the system and method for modifying visual perception is employed in a mobile device. Referring to FIG. 33 a mobile device having a lighting system 712 is shown. The lighting system 712 provides both key and fill light and is illustrated as a circular-shaped light source that surrounds the display 720. Those skilled in the art will appreciate that the light source may be of any shape. For example, in one embodiment, the light source may be a square-shaped light source (not shown) that surrounds the display 720. Further, in one embodiment, the lighting system 712 is a constant light source. Optionally, in an alternate embodiment, the lighting system 712 is a flash light source. Alternately, in an optional embodiment, the lighting system 712 is configured to act as either a constant light source or a flash light source.

Additionally, in an optional embodiment the light source may be a multi-component lighting system. For example, referring to FIG. 32, a mobile device 702 is shown. The lighting system of mobile device 702 includes a first light source 730 positioned above a display 733 and a second light source 731 positioned below the display 733. The first light source 730 acts as a key light, and the second light source 731 acts as a fill light. The light sources 730 and 731 may be constant light sources, flash lights, or a configured to work as either. In one embodiment, a camera (not shown) is embedded behind the video display 730.

Additionally, the mobile device 702 further includes a system for automatically modifying captured images. In one embodiment, under the control of a user, the embedded camera in the mobile device 702 "takes a picture" or captures an image. Optionally, the mobile device 702 may also be configured to capture and record audio data. The mobile device 702 includes an automatic modification feature. More particularly, captured data is modified automatically in real time. The captured data may include, but is not limited to, still image data, video data, audio data, and any combination thereof. In one embodiment, the automatic modification process includes a processor to evaluate a captured image and automatically adjust various features of the image. Likewise, the automatic modification process may also apply to other types of captured data, such as video data, audio data or a combination thereof. The automatic modification process may include one or more of the following adjustments: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing the image, and elongating the image.

Additionally, the mobile device 702 may also include an automatic audio modification feature that automatically modifies captured audio data. The automatic audio modification feature may include an equalizer, audio leveler and filter, similar to that described in the camera 110 embodiments above.

Further, the mobile device 702 provides a playback feature for displaying the captured image data such a captured video data and captured still image data. The mobile device 702 also includes a microphone for recording audio as well as speakers for playing back recorded audio data.

Figure 34:
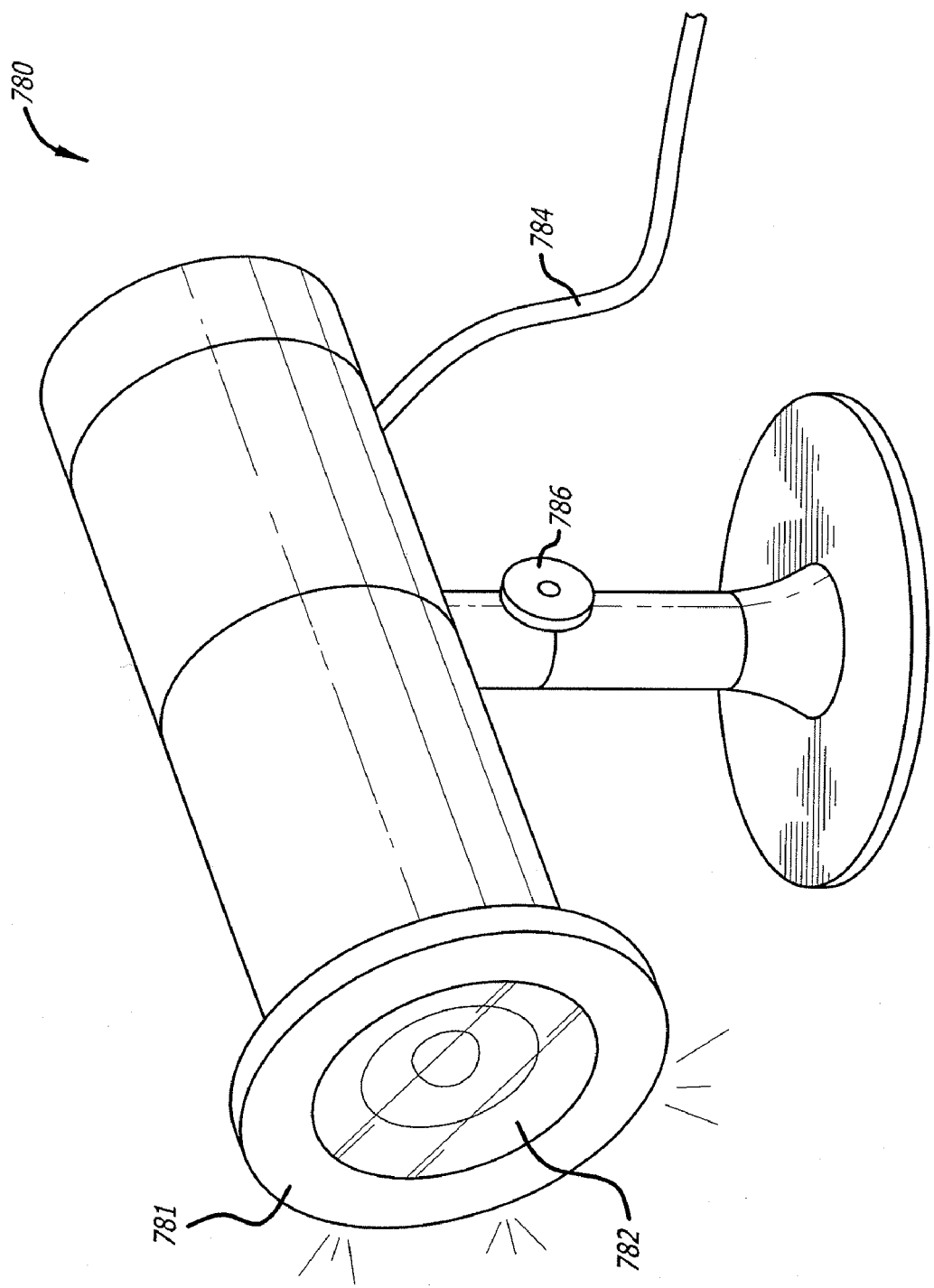
FIG. 34 is an example illustration of a web camera in accordance with an embodiment of modifying visual perception.

In another embodiment, the system and method for modifying visual perception is used in combination with a web camera as shown in FIG. 34. The web camera 780 includes a built-in lighting system 781. The built in lighting system 781 is a light source that provides both key and fill light. Additionally, in one embodiment, the lighting system 781 surrounds the lens system 782. The lighting system 781 is illustrated as a circular-shaped light source. However, those skilled in the art will appreciate that the light source may be of any shape. For example, in one embodiment, the light source may be a square-shaped light source (not shown) that surrounds the lens system 782. Additionally, in an optional embodiment (not shown), the light source may be a multi-component lighting system. For example, the lighting system may include a first light source positioned above the lens system 782 (acting as the key light) and a second light source positioned below the lens system 14 (acting as the fill light). Further, in one embodiment, the lighting system 781 is a constant light source. Optionally, in an alternate embodiment, the lighting system 781 is a flash light source. Alternately, in an optional embodiment, the lighting system 781 is configured to act as either a constant light source or a flash light source.

In one embodiment, the lighting system 781 includes a plurality LEDs positioned in a circular path. Other examples of light sources may include, but are not limited to incandescent light bulbs, arc lamps, gas discharge lamps, neon lamps, flood lamps, modern photographic flashes, lasers, organic light-emitting diodes (OLEDs), sulfur lamps, and any other known light sources.

Additionally, the lens system 782 also comprises infra red auto focus and a light meter. Those skilled in the art will appreciate that other auto focus systems and mechanisms may be used. Additionally, the position of the lens may be adjusted or manipulated by a manual pan and tilt knob 786. Further, the web camera 781 includes connected cables 784, such as USB cable or Firewire cable. Alternately, in an optional embodiment, the web camera 781 incorporates wireless technology to wireless transmit and receive information. Additionally, in one embodiment, the web camera 780 works in conjunction with a software application (not shown) that enables the user to control the pan and tilt of the camera through a software interface. Optionally, in another embodiment, the software includes a facial recognition tracking feature that automatically adjusts the pan and tilt of the camera in order to capture a user's image through the camera lens.

Further, the web camera 782 further includes a system for automatically modifying captured images. In one embodiment, under the control of a user, the web camera "takes a picture" or captures an image (either still or moving images). The captured image is modified automatically in real time. For example, in one embodiment, the automatic modification process evaluates a captured image and automatically adjusts various features of the image. For example, the automatic modification process may include one or more of the following: adjusting the exposure, adjusting highlight levels, adjusting midtone levels, adjusting lowlight levels, adjusting color temperature, adjusting tint, adjusting contrast, adjusting color saturation, sharpening the detail in the highlights, diffusing the midtones, compressing the image, and elongating the image.

The web camera 782 may also include an automatic audio modification feature that automatically modifies captured audio data in real time. The automatic audio modification feature may include an equalizer, audio leveler and filter, similar to that described in the camera 110 embodiment above.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A camera comprising:
   a camera body;
   a lens system for capturing an image, and at least a portion of the lens system positioned on the outer surface of the camera body;
   a lighting system positioned on the outer surface of the camera body and proximate to the lens system, the lighting system providing key light above the lens system and providing fill light below the lens system, wherein the key light and fill light are of different intensities during image capture;

a processor housed within the camera body, the processor controlling one or more operations of the camera including automatically enhancing the captured images; and a display presented on the outer surface of the camera body and for displaying the automatically enhanced images;

wherein the processor automatically: increases the exposure level of the non-manipulated captured image between 5% and 25%; increases the highlight levels of the non-manipulated captured image between 5% to 10%; increases the midtone levels of the non-manipulated captured image between 5% to 10%; decreases the lowlight levels of the non-manipulated captured image between 5% to 10%; adjusts the color temperature of the non-manipulated captured image by increasing the yellow tones between 50% to 150%; adjusts the tint of the non-manipulated captured image by decreasing the red tones between 5% to 10%; increases the contrast of the non-manipulated captured image between 50% to 150%; increases the color saturation of the non-manipulated captured image between 50% to 150%; diffuses the midtones of the non-manipulated captured image between 5% to 100%; increases the highlight sharpening of the non-manipulated captured image between 5% to 10%; compresses the non-manipulated captured image along the x-axis between 5% to 10%; and extends the non-manipulated captured image along the y-axis between 5% to 10%.

2. The camera of claim 1, wherein the lighting system comprises a diffuser, a reflector and a light source.

3. The camera of claim 2, wherein the diffuser includes at least one of color temperature corrections filters, polarizing filters, or any combination thereof.

4. The camera of claim 2, wherein the light source of the lighting system is a light-emitting diode, incandescent light bulb, arc lamp, gas discharge lamp, neon lamp, flood lamp, modern photographic flash, laser, organic light-emitting diode, sulfur lamp, or any combination thereof.

5. The camera of claim 1, wherein the lighting system comprises at least one of screens, filters or any combination thereof.

6. The camera of claim 1, wherein the lighting system is configured to surround the portion of the lens system positioned on the outer surface of the camera body.

7. The camera of claim 6, wherein the lighting system is in the shape of a circle, oval, square, rectangle, triangle or polygon.

8. The camera of claim 1, wherein the operation controlled by the processor is recording captured images, storing captured images, transmitting captured images, transmitting captured images in real time, transmitting streaming data, receiving data, receiving data in real time, receiving streaming data, or any combination thereof.

9. The camera of claim 1, wherein the camera wirelessly transmits captured images.

10. The camera of claim 1, further comprising a sensor operatively connected to the processor, the sensor configured to detect color quality information from a target image and use the information to adjust the coloring of the lighting system.

11. The camera of claim 1, further comprising color correction filters corresponding to at least one of a peach tone, golden tone, or nude tone.

12. The camera of claim 1, wherein the captured image is automatically modified to produce an image comprising only hues corresponding to at least one of a peach tone, golden tone, nude tone, or any combination thereof.

13. The camera of claim 1, wherein the captured image is automatically modified to produce an image comprising only hues corresponding to at least one of bastard amber, tan tone, amber blush, golden tan, or any combination thereof.

14. The camera of claim 1, wherein the captured image is automatically modified to produce an image comprising only hues corresponding to at least one of yellow tone, green tone, olive tone, or any combination thereof.

15. The camera of claim 1, wherein the captured image is automatically modified to produce an image comprising only hues corresponding to at least one of light amber, saffron, yellow sun, light yellow green, or any combination thereof.

16. The camera of claim 1, wherein the captured image is automatically modified to produce an image comprising only hues corresponding to at least one of turquoise, lavender, nude tone, or any combination thereof.

17. The camera of claim 1, wherein the captured image is automatically modified to produce an image comprising only hues corresponding to at least one of blue grass, princess blue, surprise pink, tan tone, or any combination thereof.

18. The camera of claim 1, wherein the captured image is automatically modified to produce an image comprising only hues corresponding to at least one of blue tone, brown tone, rose tone, or any combination thereof.

19. The camera of claim 1, wherein the captured image is automatically modified to produce an image comprising only hues corresponding to at least one of beverly blue, shark blue, tan tone, sepia, or any combination thereof.

20. The camera of claim 1, wherein the lighting system comprises a plurality of light-emitting diodes positioned in a circular path around the lens system.

21. The camera of claim 1, wherein the processor automatically adjusts at least one of the exposure, highlight levels, midtone levels, lowlight levels, color temperature, tint, contrast, color saturation, highlight sharpening, midtone diffusion, image compression, image elongation, or any combination thereof.

22. A camera comprising:
a camera body;
a lens system for capturing an image, and at least a portion of the lens system positioned on the outer surface of the camera body;
a lighting system positioned on the outer surface of the camera body and proximate to the lens system, the lighting system providing key light above the lens system and providing fill light below the lens system, wherein the key light and fill light are of different intensities during image capture;
a processor housed within the camera body, the processor controlling one or more operations of the camera including automatically enhancing the captured images; and
a display presented on the outer surface of the camera body and for displaying the automatically enhanced images;
wherein the processor automatically: increases the exposure level of the non-manipulated captured image by ten percent, increases the highlight levels of the non-manipulated captured image by seven percent, increases the midtone levels of the non-manipulated captured image by seven percent, decreases the lowlight levels of the non-manipulated captured image by seven percent, adjusts the color temperature of the non-manipulated captured image by increasing the yellow tones by seventy-five percent, adjusts the tint of the non-manipulated captured image by decreasing the red tones by seven percent, increases the contrast of the non-manipulated captured image by seventy-five percent, increases the contrast of the non-manipulated captured image by seventy-five percent, increases the color saturation of the non-manipulated captured image by seventy-five percent, increases the highlight sharpening of the non-manipulated captured image by seven percent, diffuses the midtones of the non-manipulated captured image by fifty percent, compresses the non-manipulated captured image along the x-axis by five percent, and extends the non-manipulated captured image along the y-axis by five percent.

23. The camera of claim 22, wherein the lighting system comprises a diffuser, a reflector and a light source.

24. The camera of claim 23, wherein the diffuser includes at least one of color temperature corrections filters, polarizing filters, or any combination thereof.

25. The camera of claim 23, wherein the light source of the lighting system is a light-emitting diode, incandescent light bulb, arc lamp, gas discharge lamp, neon lamp, flood lamp, modern photographic flash, laser, organic light-emitting diode, sulfur lamp, or any combination thereof.

26. The camera of claim 22, wherein the lighting system comprises at least one of screens, filters or any combination thereof.

27. The camera of claim 22, wherein the lighting system is configured to surround the portion of the lens system positioned on the outer surface of the camera body.

28. The camera of claim 27, wherein the lighting system is in the shape of a circle, oval, square, rectangle, triangle or polygon.

29. The camera of claim 22, wherein the operation controlled by the processor is recording captured images, storing captured images, transmitting captured images, transmitting captured images in real time, transmitting streaming data, receiving data, receiving data in real time, receiving streaming data, or any combination thereof.

30. The camera of claim 22, wherein the camera wirelessly transmits captured images.

31. The camera of claim 22, further comprising a sensor operatively connected to the processor, the sensor configured to detect color quality information from a target image and use the information to adjust the coloring of the lighting system.

32. The camera of claim 22, further comprising color correction filters corresponding to at least one of a peach tone, golden tone, or nude tone.

33. The camera of claim 22, wherein the captured image is automatically modified to produce an image comprising only hues corresponding to at least one of a peach tone, golden tone, nude tone, or any combination thereof.

34. The camera of claim 22, wherein the captured image is automatically modified to produce an image comprising only hues corresponding to at least one of bastard amber, tan tone, amber blush, golden tan, or any combination thereof.

35. The camera of claim 22, wherein the captured image is automatically modified to produce an image comprising only hues corresponding to at least one of yellow tone, green tone, olive tone, or any combination thereof.

36. The camera of claim 22, wherein the captured image is automatically modified to produce an image comprising only hues corresponding to at least one of light amber, saffron, yellow sun, light yellow green, or any combination thereof.

37. The camera of claim 22, wherein the captured image is automatically modified to produce an image comprising only hues corresponding to at least one of turquoise, lavender, nude tone, or any combination thereof.

38. The camera of claim 22, wherein the captured image is automatically modified to produce an image comprising only hues corresponding to at least one of blue grass, princess blue, surprise pink, tan tone, or any combination thereof.

39. The camera of claim 22, wherein the captured image is automatically modified to produce an image comprising only hues corresponding to at least one of blue tone, brown tone, rose tone, or any combination thereof.

40. The camera of claim 22, wherein the captured image is automatically modified to produce an image comprising only hues corresponding to at least one of beverly blue, shark blue, tan tone, sepia, or any combination thereof.

41. The camera of claim 22, wherein the lighting system comprises a plurality of light-emitting diodes positioned in a circular path around the lens system.

42. The camera of claim 22, wherein the processor automatically adjusts at least one of the exposure, highlight levels, midtone levels, lowlight levels, color temperature, tint, contrast, color saturation, highlight sharpening, midtone diffusion, image compression, image elongation, or any combination thereof.

43. A camera comprising:
a camera body;
a lens system for capturing an image, and at least a portion of the lens system positioned on the outer surface of the camera body;
a lighting system positioned on the outer surface of the camera body and proximate to the lens system, the lighting system providing key light above the lens system and providing fill light below the lens system, wherein the key light and fill light are of different intensities during image capture;
a processor housed within the camera body, the processor controlling one or more operations of the camera including automatically enhancing the captured images; and
a display presented on the outer surface of the camera body and for displaying the automatically enhanced images;
wherein the processor automatically increases the exposure level of the non-manipulated captured image by seven percent, increases the highlight levels of the non-manipulated captured image by five percent, increases the midtone levels of the non-manipulated captured image by five percent, decreases the lowlight levels of the non-manipulated captured image by five percent, adjusts the color temperature of the non-manipulated captured image by increasing the yellow tones by fifty percent, adjusts the tint of the non-manipulated captured image by decreasing the red tones by five percent, increases the contrast of the non-manipulated captured image by fifty percent, increases the color saturation of the non-manipulated captured image by fifty percent, increases the highlight sharpening of the non-manipulated captured image by five percent, diffuses the midtones of the non-manipulated captured image by twenty-five percent, compresses the non-manipulated captured image along the x-axis by 2.5 percent, and extends the non-manipulated captured image along the y-axis by 2.5 percent.

44. The camera of claim 43, wherein the lighting system comprises a diffuser, a reflector and a light source.

45. The camera of claim 44, wherein the diffuser includes at least one of color temperature corrections filters, polarizing filters, or any combination thereof.

46. The camera of claim 44, wherein the light source of the lighting system is a light-emitting diode, incandescent light bulb, arc lamp, gas discharge lamp, neon lamp, flood lamp, modern photographic flash, laser, organic light-emitting diode, sulfur lamp, or any combination thereof.

47. The camera of claim 43, wherein the lighting system comprises at least one of screens, filters or any combination thereof.

48. The camera of claim 43, wherein the lighting system is configured to surround the portion of the lens system positioned on the outer surface of the camera body.

49. The camera of claim 48, wherein the lighting system is in the shape of a circle, oval, square, rectangle, triangle or polygon.

50. The camera of claim 43, wherein the operation controlled by the processor is recording captured images, storing captured images, transmitting captured images, transmitting captured images in real time, transmitting streaming data, receiving data, receiving data in real time, receiving streaming data, or any combination thereof.

51. The camera of claim 43, wherein the camera wirelessly transmits captured images.

52. The camera of claim 43, further comprising a sensor operatively connected to the processor, the sensor configured to detect color quality information from a target image and use the information to adjust the coloring of the lighting system.

53. The camera of claim 43, further comprising color correction filters corresponding to at least one of a peach tone, golden tone, or nude tone.

54. The camera of claim 43, wherein the captured image is automatically modified to produce an image comprising only hues corresponding to at least one of a peach tone, golden tone, nude tone, or any combination thereof.

55. The camera of claim 43, wherein the captured image is automatically modified to produce an image comprising only hues corresponding to at least one of bastard amber, tan tone, amber blush, golden tan, or any combination thereof.

56. The camera of claim 43, wherein the captured image is automatically modified to produce an image comprising only hues corresponding to at least one of yellow tone, green tone, olive tone, or any combination thereof.

57. The camera of claim 43, wherein the captured image is automatically modified to produce an image comprising only hues corresponding to at least one of light amber, saffron, yellow sun, light yellow green, or any combination thereof.

58. The camera of claim 43, wherein the captured image is automatically modified to produce an image comprising only hues corresponding to at least one of turquoise, lavender, nude tone, or any combination thereof.

59. The camera of claim 43, wherein the captured image is automatically modified to produce an image comprising only hues corresponding to at least one of blue grass, princess blue, surprise pink, tan tone, or any combination thereof.

60. The camera of claim 43, wherein the captured image is automatically modified to produce an image comprising only hues corresponding to at least one of blue tone, brown tone, rose tone, or any combination thereof.

61. The camera of claim 43, wherein the captured image is automatically modified to produce an image comprising only hues corresponding to at least one of beverly blue, shark blue, tan tone, sepia, or any combination thereof.

62. The camera of claim 43, wherein the lighting system comprises a plurality of light-emitting diodes positioned in a circular path around the lens system.

63. The camera of claim 43, wherein the processor automatically adjusts at least one of the exposure, highlight levels, midtone levels, lowlight levels, color temperature, tint, contrast, color saturation, highlight sharpening, midtone diffusion, image compression, image elongation, or any combination thereof.

* * * * *

UNITED STATES PATENT AND TRADEMARK OFFICE
CERTIFICATE OF CORRECTION

PATENT NO. : 8,139,122 B2
APPLICATION NO. : 12/195369
DATED : March 20, 2012
INVENTOR(S) : Matthew Rolston It is certified that error appears in the above-identified patent and that said Letters Patent is hereby corrected as shown below:

Column 5, In line 7, Add --of-- after "perspective"

Column 5, In line 15, Change "a" to --an--

Column 9, In line 47, Delete "is" after "10"

Column 12, In line 27, Change "adjust" to --adjusts--

Column 16, In line 26, Change "date" to --data--

Column 16, In line 54, Add --digital images-- after "recorded"

Column 17, In line 15, Add --to-- after "presented"

Column 19, In line 30, Change "date" to --data--

Column 19, In line 59, Change "Pantone" to --PANTONE--

Column 25, In line 16, Change "lights" to --light--

Column 25, In line 35, Delete "by" after "the"

Column 25, In line 35, Change "Pantone" to --PANTONE--

Column 25, In line 36, Change "Pan" to --PAN--

Column 25, In line 37, Change "tone" to --TONE--

Column 26, In line 8, Delete "by" after "the"

Column 26, In line 8, Change "Pantone" to --PANTONE--

Column 26, In line 9, Change "Pantone" to --PANTONE--

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,139,122 B2

Column 27, In line 8, Change "know" to --known--

Column 29, In line 46, Change "a" to --as--

Column 30, In line 21, Change "wireless" to --wirelessly--